US012325840B2

(12) United States Patent
Brewer et al.

(10) Patent No.: US 12,325,840 B2
(45) Date of Patent: Jun. 10, 2025

(54) DETERGENT FORMULATIONS HAVING ENHANCED GERM REMOVAL EFFICACY

(71) Applicant: Reckitt Benckiser LLC, Parsippany, NJ (US)

(72) Inventors: Sam Brewer, Montvale, NJ (US); Rashda Khan, Boca Raton, FL (US); Remigio Musci, Milan (IT); Tracy Ann Ryan, Montvale, NJ (US); Alberto Simionato, Milan (IT); Kyle Smith, Montvale, NJ (US); Elisa Vanzetto, Milan (IT)

(73) Assignee: Reckitt Benckiser LLC, Parsippany, NJ (US)

( * ) Notice: Subject to any disclaimer, the term of this patent is extended or adjusted under 35 U.S.C. 154(b) by 754 days.

(21) Appl. No.: 17/519,806

(22) Filed: Nov. 5, 2021

(65) Prior Publication Data

US 2022/0064571 A1 Mar. 3, 2022

Related U.S. Application Data

(63) Continuation-in-part of application No. PCT/GB2020/051241, filed on May 21, 2020.

(Continued)

(51) Int. Cl.

*C11D 1/94* (2006.01)
*C11D 3/20* (2006.01)

(Continued)

(52) U.S. Cl.

CPC .............. *C11D 1/94* (2013.01); *C11D 3/2086* (2013.01); *C11D 3/30* (2013.01); *C11D 3/38618* (2013.01); *C11D 3/48* (2013.01); *C11D 1/667* (2013.01); *C11D 1/72* (2013.01); *C11D 1/90* (2013.01); *C11D 2111/12* (2024.01)

(58) Field of Classification Search

CPC .... C11D 1/94; C11D 3/48; C11D 3/30; C11D 3/2086; C11D 3/38618; C11D 11/0017

See application file for complete search history.

(56) References Cited

U.S. PATENT DOCUMENTS 5,728,667 A * 3/1998 Richter ................ C11D 3/0094 510/237
5,798,329 A * 8/1998 Taylor ...................... C11D 1/86 510/276

(Continued)

FOREIGN PATENT DOCUMENTS

GB 2188058 A1 9/1987
JP 2013057026 A 3/2013

(Continued)

OTHER PUBLICATIONS

CN Office Action for corresponding application CN 202080036992.7 dated Aug. 1, 2024.

(Continued)

*Primary Examiner* — Peter F Godenschwager
*Assistant Examiner* — M. Reza Asdjodi
(74) *Attorney, Agent, or Firm* — Norris McLaughlin, P.A.

(57) ABSTRACT

Laundry detergent formulations for everyday use having cleaning and enhanced germ removal efficacy, as well as consumer acceptable viscosity levels and long-term stability profiles, are disclosed.

17 Claims, 3 Drawing Sheets

Related U.S. Application Data

(60) Provisional application No. 62/851,315, filed on May 22, 2019.

(51) Int. Cl.

| | |
|---|---|
| ***C11D 3/30*** | (2006.01) |
| ***C11D 3/386*** | (2006.01) |
| ***C11D 3/48*** | (2006.01) |
| ***C11D 11/00*** | (2006.01) |
| *C11D 1/66* | (2006.01) |
| *C11D 1/72* | (2006.01) |
| *C11D 1/90* | (2006.01) |

(56) References Cited

U.S. PATENT DOCUMENTS

| | | | | |
|---|---|---|---|---|
| 6,090,768 | A * | 7/2000 | Delaney | C11D 3/48 510/394 |
| 6,339,057 | B1 * | 1/2002 | Knox | C11D 1/94 510/237 |
| 8,440,605 | B2 * | 5/2013 | Wise | C11D 11/0094 510/156 |
| 10,435,652 | B2 | 10/2019 | Nakanishi et al. | |
| 10,487,291 | B2 | 11/2019 | Veith et al. | |
| 2002/0169099 | A1 * | 11/2002 | Knox | C11D 3/0094 510/421 |
| 2004/0248760 | A1 * | 12/2004 | Woodhead | C11D 1/662 510/470 |
| 2010/0216890 | A1 | 8/2010 | Lichtenberg et al. | |
| 2018/0179467 | A1 * | 6/2018 | Meier | C11D 11/0094 |
| 2022/0064571 | A1 * | 3/2022 | Brewer | C11D 1/83 |

FOREIGN PATENT DOCUMENTS

| | | | | |
|---|---|---|---|---|
| JP | 2013057026 | A1 | 3/2013 | |
| WO | WO-9531962 | A1 * | 11/1995 | A61K 8/39 |
| WO | 9712018 | A1 | 4/1997 | |
| WO | WO-9715647 | A1 * | 5/1997 | C11D 1/83 |
| WO | WO-9728238 | A1 * | 8/1997 | C11D 1/86 |
| WO | 09943775 | A1 | 9/1999 | |
| WO | 2009117299 | A2 | 9/2009 | |
| WO | 2015086608 | A1 | 6/2015 | |
| WO | 2016008765 | A1 | 1/2016 | |

OTHER PUBLICATIONS

"Typical distributions of NEODOL(TM) ethoxylate adducts", Shell Chemicals, pp. 1-2, www.shell.com/chemicals, XP055709161.

* cited by examiner

DETERGENT FORMULATIONS HAVING ENHANCED GERM REMOVAL EFFICACY

CROSS REFERENCE TO RELATED APPLICATIONS

This application is a continuation-in-part of PCT application no. PCT/GB2020/051241, filed 21 May 2020, which claims priority to U.S. provisional application No. 62/851,315, filed 22 May 2019. The present application incorporates by reference the entirety of the foregoing as if set forth herein.

FIELD

Laundry detergent formulations for everyday use having cleaning and enhanced germ removal efficacy, as well as consumer acceptable viscosity levels and long-term stability profiles, are disclosed.

BACKGROUND

PCT Publication WO97/12018 to The Procter & Gamble Company discloses a liquid laundry detergent composition comprising a surfactant system which is free of linear alkyl benzene sulfonate comprising: 1) anionic surfactants selected from the group of alkyl alkoxy sulfates and alkyl sulfates and 2) a selected quaternary ammonium surfactant.

U.S. Pat. No. 5,798,329 to Reckitt & Colman Inc discloses liquid laundry detergent compositions providing good detergency for the cleaning of garments and textiles, as well as further providing a germicidal action to textile fabrics in a domestic laundering process.

U.S. Pat. No. 6,090,768 to Reckitt & Colman Inc discloses a liquid laundry detergent composition providing good detergency for the cleaning of garments and textiles, as well as further providing a germicidal action to textile fabrics in a domestic laundering process.

PCT Publication WO2009/117299 to Altos Medical LLC discloses a cleaning preparation, namely to a cleaning, disinfecting, sanitizing, and sterilizing preparation comprises a mixture of cationic microbiocides and non-ionic surfactants.

US Patent App Pub No 2010/0216890 to Lichtenberg et al. discloses disinfectant compositions containing (a) at least one amine and/or quaternary salt and (b) at least one alkanolamine.

PCT Publication WO2015/086608 to L'Oreal discloses a cleansing composition comprising (a) at least one nonionic surfactant, (b) at least one amphoteric surfactant; (c) at least one component selected from (i) a nonionic thickener or (ii) (1) a cationic agent combined with (ii) (2) an anionic surfactant, or a mixture of a nonionic thickener plus cationic agent and/or anionic surfactant; and (d) water.

PCT Publication WO2016/008765 to BASF discloses a liquid detergent composition comprising at least one chelating agent selected from alkali metal salts of methyl glycine diacetate and glutamic acid diacetate and at least one anionic surfactant.

U.S. Pat. No. 10,435,652 to Lonza LTD discloses a liquid laundry detergent composition for clothing comprising a bacteria-eliminating agent, at least one cationic polymer selected from three options, and a surfactant.

U.S. Pat. No. 10,487,291 to Henkel AG & Co KGaA discloses a detergent or cleaning agent that has an antimicrobial effect an includes at least one tetracarboxylic acid or the salts thereof in combination with at least one biocidal quaternary ammonium compound.

A need remains for a stable, commercially viable laundry detergent formulations exhibiting suitable cleaning action and enhanced germ removal efficacy. Preferably, the laundry detergent formulations have consumer acceptable viscosity levels, ranging from approximately 180 cps to approximately 750 cps as measured by a Brookfield viscometer using spindle S31 at 20° C. and 20 rpm.

BRIEF SUMMARY

Laundry detergent compositions for everyday use having cleaning and enhanced germ removal efficacy are disclosed. The compositions comprise a cationic biocide, a nonionic surfactant, and an anionic surfactant, wherein the nonionic surfactant is the predominant surfactant. The disclosed compositions may include one or more of the following aspects:

- the nonionic surfactant being present in the composition in an amount by weight greater than the active amount by weight of any other type of surfactant;
- the nonionic surfactant being present in the composition in an amount by weight greater than the total combined active amount by weight of all other types of surfactants.
- the composition having a viscosity ranging from approximately 180 cps to approximately 750 cps as measured by a Brookfield viscometer using spindle S31 at 20° C. and 20 rpm;
- the composition having a viscosity ranging from approximately 200 cps to approximately 500 cps as measured by a Brookfield viscometer using spindle S31 at 20° C. and 20 rpm;
- the anionic surfactant comprising an alkali or alkaline salt of an alkyl ether sulfate;
- the anionic surfactant being an alkali or alkaline salt of an alkyl ether sulfate;
- the anionic surfactant comprising an alkali or alkaline salt of a C10-C20 ether sulfate;
- the anionic surfactant being an alkali or alkaline salt of a C10-C20 ether sulfate;
- the anionic surfactant comprising an alkali or alkaline salt of a C10-C16 ether sulfate;
- the anionic surfactant being an alkali or alkaline salt of a C10-C16 ether sulfate;
- the anionic surfactant comprising an alkali or alkaline salt of a C12-C16 ether sulfate;
- the anionic surfactant being an alkali or alkaline salt of a C12-C16 ether sulfate;
- the anionic surfactant comprising a sodium salt of a C12-14 ethoxylated alkyl sulfate;
- the anionic surfactant being a sodium salt of a C12-14 ethoxylated alkyl sulfate;
- the anionic surfactant comprising sodium lauryl ether sulfate;
- the anionic surfactant being sodium lauryl ether sulfate;
- the cationic biocide having no benzyl functional groups;
- the cationic biocide being a single biocide;
- the cationic biocide being bis(3-aminopropyl) dodecylamine;
- the cationic biocide being alkyl dimethyl ammonium chloride;
- the cationic biocide being dodecyl dimethyl ammonium chloride;
- the cationic biocide being alkyl dimethyl benzyl ammonium chloride;
- the cationic biocide being benzylammonium chloride;

the cationic biocide being a blend of two or more biocides;

the composition further comprising an amphoteric surfactant;

the amphoteric surfactant being a betaine;

the amphoteric surfactant being a cocamidopropyl betaine;

the nonionic surfactant comprising a C12-16 7 EO alcohol ethoxylate nonionic surfactant (hereinafter "EA 7EO");

the nonionic surfactant consisting of EA 7EO;

the nonionic surfactant comprising a mixture of EA 7EO and a C10-16 3EO alcohol ethoxylate nonionic surfactant (hereinafter "EA 3EO");

the nonionic surfactant consisting of a mixture of EA 7EO and EA 3EO;

a ratio of EA 7EO:EA 3EO ranging from approximately 2.3:1 to approximately 2.9:1;

a ratio of EA 7EO:EA 3EO being 2.6:1;

a ratio of EA 7EO:EA 3EO being 2.9:1;

the nonionic surfactant further comprising a C13-15 8 EO alcohol ethoxylate nonionic surfactant (hereinafter "EA 8EO");

the nonionic surfactant comprising a mixture of EA 7EO and EA 8EO;

the nonionic surfactant consisting of a mixture of EA 7EO and EA 8EO;

the composition further comprising an alkanolamine;

the alkanolamine being triethanolamine;

the alkanolamine being monoethanolamine;

the composition further comprising a cellulase;

the composition further comprising a protease;

the composition further comprising a mixture of a protease and an amylase;

the composition further comprising a mixture of a protease, an amylase, and a mannanase;

the composition further comprising the tetrasodium salt of L-glutamic acid N,N-diacetic acid;

the composition further comprising water;

the composition further comprising between approximately 55% w/w and approximately 75% w/w water;

the composition not comprising a biguanide;

the composition not comprising a guanide;

the composition not comprising a biguanidine;

the composition not comprising a guanidine;

the composition not comprising a polyquaternium;

the laundry detergent formulation removing odor causing bacteria;

the laundry detergent formulation providing a greater than approximately 3.5 log 10 reduction in *Klebsiella pneumoniae* ATCC 4352;

the laundry detergent formulation providing a greater than approximately 2.5 log 10 reduction in *Staphylococcus aureus* ATCC 6538; and/or the laundry detergent formulation providing between approximately 85 and approximately 89 residual stain index; and/or the laundry detergent formulation providing between approximately 1 log 10 and 5 log 10 reduction of poliovirus type 1 (Sabin) when tested according to the current version of ASTM E1052.

Terms and Definitions

As used herein, the term "approximately" means plus or minus 10% of the value stated.

As used herein, the term "germ" means a microorganism, especially one which causes disease, and includes both bacteria and viruses.

As used herein, the term "a" or "an" means one or more.

As used herein, the abbreviation "cps" means centipoise.

As used herein and unless otherwise stated, the w/w percentages are based on the weight of the material being measured versus the weight of the total composition. For materials that do not have 100% activity, the w/w percentage may be the % activity of that ingredient versus the weight of the total composition. In the Examples, the activity level is provided in parentheses when the ingredient weight is not 100% active (e.g. "total weight (active weight)").

As used herein, any and all ranges are inclusive of their endpoints. For example, a concentration of biocide ranging from 1% w/w to 10% w/w would include formulations having 1% w/w biocide, formulations having 10% w/w biocides, and formulations having any concentration of biocide between 1% w/w and 10% w/w.

DETAILED DESCRIPTION

Laundry detergent formulations for everyday use having cleaning and enhanced germ removal efficacy are disclosed. The formulations also exhibit consumer acceptable viscosity levels and long-term stability profiles. The compositions comprise a cationic biocide, a nonionic surfactant, and an anionic surfactant, wherein the nonionic surfactant is the predominant surfactant. By predominant surfactant it will be understood that the amount by weight of nonionic surfactant present in the composition is higher than the active amount by weight of any other type of surfactant present in the formulation. Preferably, the amount by weight of nonionic surfactant present in the composition is higher than the combined amount of said cationic biocide and said anionic surfactant.

Anionic surfactants are effective at cleaning clothing. These surfactants are present in detergents, due to their strong washing performance and foaming properties.

Cationic biocides are effective at removing odor-causing bacteria from clothing. *Klebsiella pneumoniae* and *Staphylococcus aureus* have been identified as some odor-causing bacteria, although there are more than those two.

The issues that arise from mixing cationic and anionic surfactants are well known. As shown in the examples that follow, the mixture of cationic biocides and anionic surfactants may produce unstable and turbid solutions. For example, formulations E9 to E12 include both the anionic surfactant sodium lauryl ether sulfate and either bis(3-aminopropyl) dodceylamine or benzylammonium chloride as cationic biocides. After 12 days, all 4 formulations exhibited precipitation. While many references claim to have developed formulation containing anionic and cationic ingredients, the inventors are not aware of any such commercially available formulations.

Figure 1:
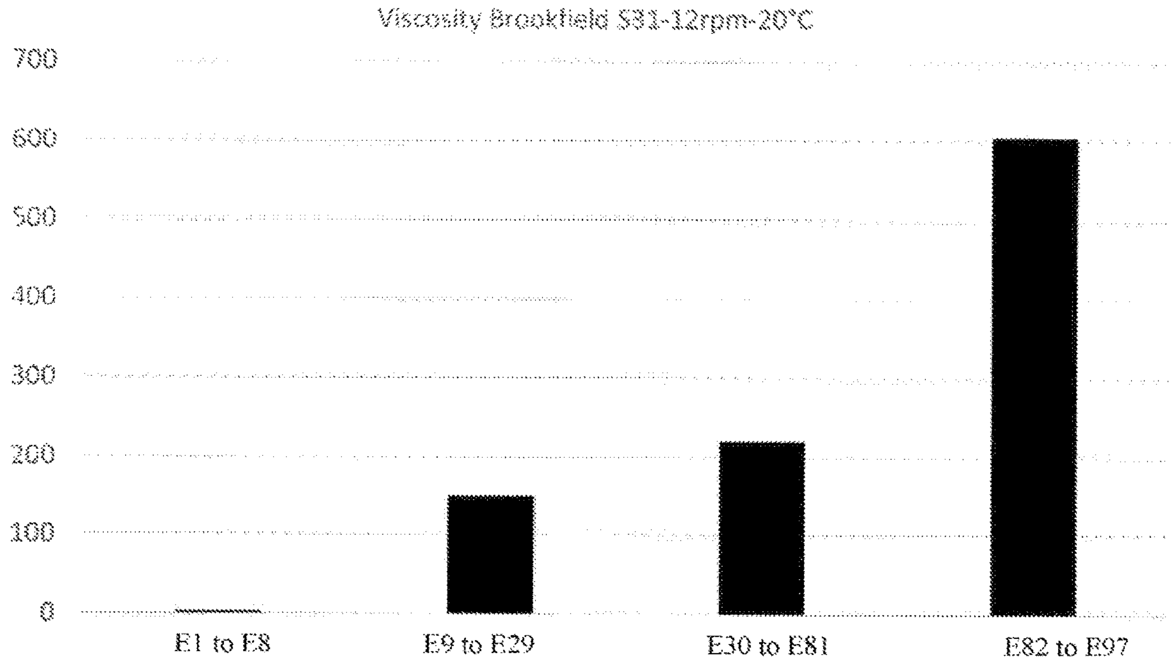
FIG. 1 is a graph showing the average viscosity in cps of formulations E1-E8, E9-E29, E30-E81, and E82-E98.
Figure 2:
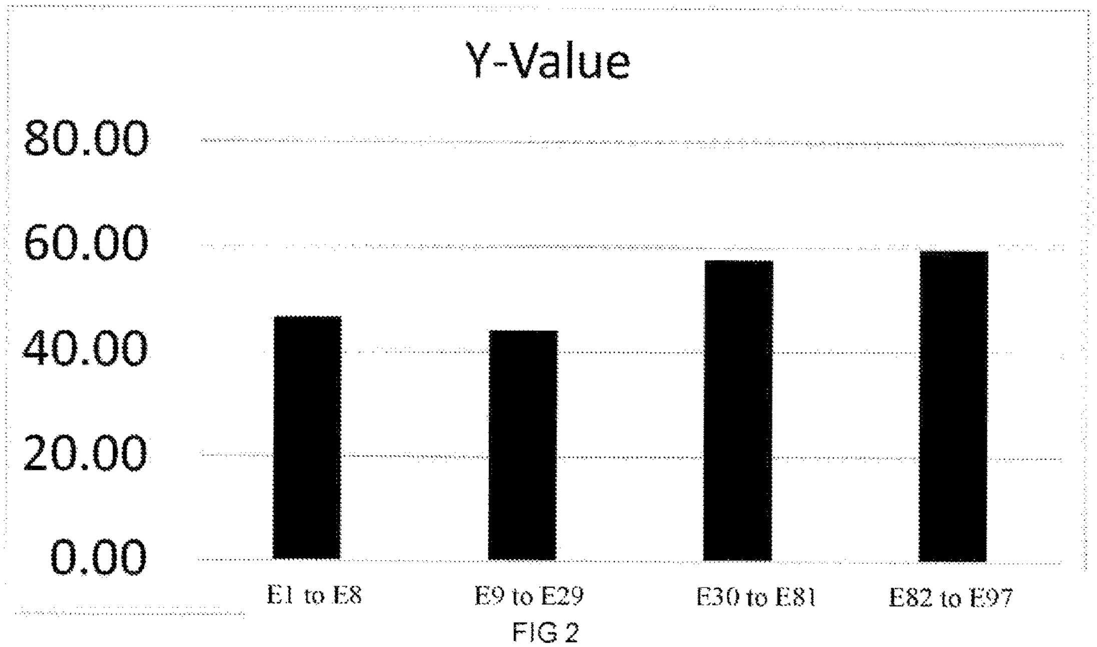
FIG. 2 is a graph showing the average Y value of formulations E1-E8, E9-E29, E30-E81, and E82-E98.

Typically, nonionic surfactant based formulations have been used to keep cationic biocides stable in laundry detergent formulations (see, e.g., WO2009/117299 to Altos Medical LLC). As demonstrated in formulations E1 to E8 and FIG. 1, nonionic based formulations have low viscosity (below 100 cps). While FIG. 2 shows formulations E1 to E8 exhibiting better average strain removal than formulations E9 to E29, Applicant has additional data that shows that formulations E1 to E8 exhibit low performance specifically on greasy stains.

As disclosed herein, stable formulations having acceptable viscosity levels have been developed that include both anionic surfactants and cationic biocides. The compositions exhibit a viscosity ranging from approximately 180 cps to approximately 750 cps, preferably from approximately 200 cps to approximately 500, cps as measured by a Brookfield viscometer using spindle S31 at 20° C. and 20 rpm.

Anionic surfactants suitable for use in the teachings in the disclosed formulations include alkali or alkaline salts of alkyl ether sulfates. The alkyl group contains from 10 to 20 carbons, alternatively from 10 to 16 carbons, alternatively from 12 to 16 carbons, or in another alternative from 10 to 14 carbons. Sodium lauryl (C12) ether sulfate, sold as CosmacolAES 70-3-24 AL by Sasol, was used in the examples that follow. The inventors expect no to minimal changes in the results from the use of alkyl ether sulfates having any of the other C10-C20 alkyl groups.

Applicants have surprisingly discovered that formulations containing low levels of anionic surfactants still provide superior cleaning efficacy. The disclosed laundry detergent compositions may contain between approximately 0.5% w/w and approximately 6.0% w/w of the anionic surfactant, preferably approximately 2.0% w/w. The activity level of the anionic surfactant may range from approximately 0.15% w/w to approximately 2% w/w of the formulation, alternatively from approximately 0.5% w/w to approximately 1.5% w/w, alternatively from approximately 0.25% w/w to approximately 1% w/w, alternatively from approximately 0.15% w/w to approximately 1.5% w/w, alternatively from approximately 0.15% w/w to approximately 0.1% w/w, or in another alternative from approximately 0.2% w/w to approximately 0.6% w/w.

The inventors believe that ethoxylation of the anionic surfactant make it compatible with certain cationic biocides. The degree of ethoxylation ranges from approximately 1 to approximately 7, preferably from approximately 2 to approximately 4. One of ordinary skill in the art will recognize that ethoxylation does not produce 100% of the stated ethoxylation groups. Instead, the resulting level of ethoxylation resembles a bell-shaped curve, with the predominant number being at the peak of the bell curve. For example, 2 ethoxylate groups are listed on the specification for the sodium lauryl ether sulfate used in the following examples. One of ordinary skill in the art will recognize that minor quantities of both 1 and 3 ethoxylate groups may also be present in that material.

Cationic biocides suitable for use in the teachings of the disclosed formulations include quaternary ammonium compounds. The disclosed laundry detergent compositions contain between approximately 1.0% w/w and 5.0% w/w of the cationic biocide raw material. The activity level of the cationic biocide also may range from approximately 0.5% w/w to 5% w/w of the formulation, alternatively from approximately 0.5% w/w to approximately 3% w/w, alternatively from approximately 0.5% w/w to approximately 2.5% w/w, or in another alternative from approximately 1% w/w to approximately 2% w/w.

Polycationic polymers, such as polyquaternium, are not suitable as biocides for the teachings herein because they are not as efficacious as single head cationic head quaternary ammonium compounds. Polycationic polymers would not be able to obtain the same biocidal activity as shown in the examples that follow in a cost effective manner.

Exemplary biocides include alkyl dimethyl ammonium chloride, sold under the tradename Bardac® 2080 by Lonza; dodecyl dimethyl ammonium chloride, sold under the tradename Bardac® 2280 by Lonza; alkyl dimethyl benzyl ammonium chloride, sold under the tradename Barquat® MB-80; benzylammonium chloride, sold under the tradename Empigen® BAC80 by Huntsman; bis(3-aminopropyl) dodecyl amine, sold under the tradename Lonzabac® 12.100 by Lonza; and mixtures thereof.

As shown in the Examples that follow, precipitation and instability occur more frequently with cationic biocides that include a benzyl functional group, such as Barquat® MB80 and Empigen® BAC80. As a result, cationic biocides that exclude benzyl functional groups are preferred in the teachings herein.

The inventors have surprisingly observed that a blend of cationic biocides have a better biocide activity than a single biocide. More particularly, as demonstrated in Tables 23 and 24, formulation E53 in Table 17 containing a blend Bardac/Lonzabac with a ratio between 0.8 and 1.5 produced exponentially better results than either biocide alone in formulations E49, E50, or E52. Preferred cationic biocides include alkyl dimethyl ammonium chloride, sold under the tradename Bardac 2080 by Lonza, bis(3-aminopropyl) dodecyl amine, sold under the tradename Lonzabac 12.100 by Lonza, and mixtures thereof. The disclosed laundry detergent compositions contain between approximately 1.0% w/w and 5.0% w/w of the cationic biocide blend.

A mixture of cationic and nonionic surfactants are combined in the present formulation. The mixture keeps the cationic biocides stable in the formulation. The mixture has higher viscosity (above 180 cps, preferably above 200 cps) when compared to nonionic surfactant based formulations. The mixture also provides better foam as compared to nonionic surfactant based formulations. As shown in the Examples, particularly formulations E49, E50, E52 and E53, the blend of cationic biocides may be used to exponentially increase the bactericide power when compared to the single cationic biocide.

Nonionic surfactants suitable for use in the teachings of the disclosed formulations include C10-C16 alcohol ethoxylates. The number of carbons in the organic carbon chain backbone attached to the ethoxylated alcohol functional group may be chosen to provide optimum cleaning performance (e.g., C10-C12 or C12-C14). The disclosed laundry detergent compositions contain between approximately 4% w/w and approximately 25% w/w of the nonionic surfactant, alternatively between approximately 4% w/w and approximately 10% w/w, alternatively between approximately 8% w/w and approximately 15% w/w, alternatively between approximately 10% w/w to approximately 20% w/w, alternatively between approximately 15% w/w to approximately 25% w/w, alternatively between approximately 12% w/w to approximately 15% w/w, or in another alternative between approximately 11% w/w to approximately 15% w/w.

Exemplary nonionic surfactants include C12-C16 alcohol ethoxylates having 7 ethoxylate groups, C10-C16 alcohol ethoxylates having 3 ethoxylate groups, C13-C15 alcohol ethoxylates having 8 ethoxylate groups, and any combinations thereof. One of ordinary skill in the art will recognize that ethoxylation does not produce 100% of the stated ethoxylation groups. Instead, the resulting level of ethoxylation resembles a bell-shaped curve, with the predominant number being at the peak of the bell curve. For example, 8 ethoxylate groups are listed on the specification for the C13-C15 alcohol ethoxylate used in the following examples. One of ordinary skill in the art will recognize that minor quantities of 4, 5, 6, 7, 9, 10, 11, and 12 ethoxylate groups may also be present in that material.

Exemplary C10-C16 alcohol ethoxylates having 3 ethoxylate groups include but are not limited to those sold by Sasol under the tradename Novel® 1412-3 ethoxylated. Exemplary C12-C16 alcohol ethoxylates having 7 ethoxylate groups include but are not limited to those sold by Sasol under the tradename Novel® 1412-7 ethoxylated. Exemplary C13-C15 alcohol ethoxylates having 8 ethoxylate groups include but are not limited to those sold by BASF under the tradename Lutensol® AO8. One of ordinary skill in the art will recognize that ethoxylated alcohols having different chain lengths and degrees of ethoxylation may also be suitable for use in the teachings herein.

The inventors have discovered that specific ratios of 7 ethoxylated (7EO) and 3 ethoxylated (3EO) nonionic surfactants surprisingly increase the viscosity as compared to the single nonionic surfactant. The ratio of 7EO/3EO ranges between approximately 2.3:1 and approximately 2.9:1, preferably approximately 2.6:1 or approximately 2.9:1. Moreover, adding an anionic ethoxylated surfactant and an amphoteric surfactant to the formulation further helps to boost the viscosity.

The laundry detergent formulations may further comprise an amphoteric surfactant. The disclosed laundry detergent compositions may contain between approximately 3% w/w to approximately 15% w/w of amphoteric surfactant material. The activity level of the amphoteric surfactant may range from approximately 0.25% w/w to 4% w/w of the formulation, alternatively from approximately 0.25% w/w to 3.5% w/w, from approximately 0.25% w/w to 2.5% w/w, alternatively from approximately 0.25% w/w to 1% w/w, alternatively from approximately 1% w/w to 2% w/w, alternatively from approximately 2% w/w to 3% w/w, or in another alternative from approximately 1.5% w/w to 3.5% w/w.

The amphoteric surfactant may be a betaine, such as cocoamidopropyl betaine. Exemplary betaines include but are not limited to cocoamidopropyl betaine, sold under the tradename Amphotesid B4 by ZSCHIMMER & SCHWARZ ITALIANA S.P.A.

The blend of nonionic, anionic and optional amphoteric surfactants have the capability to stabilize the cationic biocide in the formula, giving a viscosity in the range of approximately 180 cps to approximately 750 cps, preferably from approximately 200 cps to approximately 500 cps. As shown in the examples, the formulation also exhibits better performance when compared to similar formulations using just one of the components.

The pH of the laundry detergent ranges from approximately 8.0 to approximately 8.5 at room temperature (approximately 20° C. to approximately 22° C.). The pH may be adjusted using any suitable pH adjusters, such as citric acid, sodium citrate dihydrate, sodium hydroxide, triethanolamine, monoethanolamine, or any combinations thereof.

The laundry detergent formulation may further comprise a chelant, such as L-glutamic acid N,N'-diacetic acid, tetrasodium salt (45%), e.g., sold by AkzoNobel as Dissolvine® GL-45 or GL-47; a modified biopolymer sold by BASF under the trade name Coltide™ Radiance LQ; or 1-hydroxyethylidene-1,1-diphosphonic acid, sold by Italmatch as Dequest® FS.

The laundry detergent formulation may further comprise a liquid optical brightener between 0.1% w/w and 0.8% w/w, preferably 0.5% w/w. Exemplary optical brighteners include but are not limited to 4,4'-distyryl biphenyl derivatives sold under the trade name Tinopal CBS-CL by BASF or disodium-4-4-bis-2-sulfostyryl-biphenyl, sold by Vesta Chemicals as Viobrite CBS or Dalian Richfortune Chemicals as FWA CBS-X.

The laundry detergent formulation may further comprise enzymes, such as a protease, an amylase, a mannanase, a cellulase, or combinations thereof. Exemplary enzymes suitable for use in the disclosed laundry detergent formulation include but are not limited to those sold by DuPont under the tradename Effectenz® P-150; sold by Novozymes under the trade name Progress Uno 101L, Savinase® 16.0 L EX, Stainzyme® 12L, Mannaway® 4.0L, Medley® Core 200L, CelluClean® 5000; or any combinations thereof.

The laundry detergent formulations may further comprise solvents, fragrance, color, or combinations thereof. Suitable solvents include but are not limited to water, ethanol, glycerin, propylene glycol, triethanolamine, monoethanolamine, or combinations thereof.

The laundry detergent formulation preferably excludes thickener components, such as cellulose or polycationic or polysaccharide polymers, such as polyquaternium, xanthum gum, guar gum, polycarboxylate polymers, polyacrylamides, clays, or mixtures thereof.

In one embodiment, the disclosed laundry detergent formulations comprise, consist essentially of, or consist of: approximately 55% w/w to approximately 75% w/w water; approximately 0.15% active w/w to approximately 1.5% active w/w sodium lauryl ether sulfate; approximately 14% w/w to approximately 22% w/w nonionic surfactant; approximately 0.25% active w/w to approximately 1.5% active w/w tetrasodium salt of L-glutamic acid N,N'-diacetic acid; approximately 2% w/w to approximately 4% w/w glycerin; approximately 1.5% active w/w to approximately 3% active w/w cocoamidopropyl betaine; approximately 1.5% active w/w to approximately 2.5% active w/w alkyl dimethyl ammonium chloride; approximately 0.01% active w/w to approximately 0.1% active w/w 4,4'-distyryl biphenyl derivative; and protease enzymes. Triethanolamine, citric acid, fragrance, color, and additional enzymes may also be included in the disclosed laundry detergent formulations. The nonionic surfactant may include approximately 7.5% w/w to approximately 11.5% 7EO, approximately 0% w/w to approximately 4% w/w 3EO, and/or approximately 0% w/w to approximately 11% w/w 8 EO. The resulting formulations are clear/transparent.

The disclosed laundry detergent formulations may be prepared by mixing the optional amphoteric surfactant, optional chelant, and water for about 15 minutes. If necessary, the pH of the solution is adjusted to a range of approximately 8 to approximately 8.4 using a pH adjuster to form a pH-adjusted solution.

The cationic biocide is added to the pH adjusted solution, followed by the anionic surfactant, which is followed by the nonionic surfactant. As discussed in the examples that follow, the inventors have discovered that the viscosity of the formulation obtained when the anionic and nonionic surfactants are added prior to the cationic biocide is lower than when the cationic biocide is added first.

After addition of the nonionic surfactant, the mixture is stirred for approximately 5 to approximately 20 minutes, depending on the size of the vessel, temperature, and mixing speed. Glycerin and any additional nonionic surfactants included in the formulation are added after mixing. Any optional whiteners, enzymes, and color/dye are subsequently added.

Alternatively, the disclosed laundry detergent formulations may be prepared by mixing the following ingredients with water (added one by one or all at once): optional amphoteric surfactant, glycerin, optical brightener, & optional chelator. Applicants have found that adding the optional amphoteric surfactant to the formulation prior to adding any cationic and/or anionic surfactants yields faster stability and shortens production time. Adding the optional amphoteric surfactant to the formulation after the cationic and/or anionic surfactant may produce a cloudy formulation that takes time to clarify. This wait time may be avoided by adding the optional amphoteric surfactant prior to the cationic and anionic surfactants. Once the solution is homogeneous, the 7EO alcohol ethoxylate is added to the mixture (and mixed until again homogeneous).

The cationic surfactant is then blended into the solution until clear & uniform. The anionic surfactant is then be added and mixed until homogeneous. Once these surfactants have been adequately blended, the pH of the solution may be buffered (lower) using citric acid to a range between a pH of 7 and 9, preferably 8 to 9. One of ordinary skill in the art will recognize that a pH between 7 and 9 is better for enzyme stability than higher or lower pHs.

Once the solution is again homogeneous, the 8EO alcohol ethoxylate is added to the solution, thickening the formulation significantly. After dissolving, the optional 3EO ethoxylated alcohol is added to the solution & mixed until homogeneous. At this point, any enzymes, fragrance, and/or color/dye are added & mixed until visually clear/uniform.

Methods of cleaning and sanitizing fabrics are also disclosed. Between approximately 35 mL to approximately 90 mL of the disclosed laundry detergent formulation may be added to the soap dispenser or tub of a washing machine on any washing cycle based on the usage instructions (e.g., delicate, bulky, etc). One of ordinary skill in the art will recognize that some washing machines utilize 57 L of water, similar to those sold in the US. Please note that the guidance from the American Association of Textile Chemists and Colorists (AATCC) shows water volume ranges from 11 L to 76 L for US washing machines, which encompasses both High Efficiency (HE) vs non-HE and top vs front loading machines. Some washing machines have also been developed that utilize approximately 15 L to approximately 17 L of water, similar to those sold in Europe. The test results in the Examples are based on the dilutions that occur when using 45 mL in a 57 L machine. One of ordinary skill in the art will recognize that biocide and surfactant concentrations on the lower end of the ranges may be used in low-water HE machines and biocide and surfactant concentrations on the higher end of the ranges may be required in high-water machines.

Alternatively, fabrics may be cleaned and sanitized by PRE-SOAK. For pre-soak, method ASTM D4265 can be utilized to evaluate cleaning performance, AOAC 955.14 & 955.15 can be utilized to evaluate bacteria kill, and ASTM E1053 can be utilized to assess virucidal activity. Recommended pre-soak instructions would be to pre-soak the clothing in an insulated vessel using 120 mL of product into 1 quart of hot (50° C.) water for a period ranging from approximately 9 minutes to approximately 15 minutes (for bacteria kill), preferably approximately 10 to approximately 12 minutes. Alternatively, for virus kill, pre-soak instructions could be to pre-soak in a vessel using 90 mL of product into 1 gallon of cold (20° C.) water for a period ranging from approximately 9 minutes to approximately 15 minutes, preferably approximately 10 to approximately 12 minutes. For cleaning, dilutions can be adjusted as needed.

The combination and respective levels of ingredients disclosed herein provide consumer acceptable cleaning based on ASTM D4265 when compared to leading market competitors. Further data has been obtained through consumer use testing that confirm these results. Additionally, technical and consumer testing confirm that the level of bacteria is significantly decreased on the fabric which based on both lab test methods and consumer perception.

The disclosed formulations are also being subject to the current version of ASTM E1053 Standard Practice to Assess Virucidal Activity of Chemicals Intended for Disinfection of Inanimate, Nonporous Environmental Surfaces in order to evaluate efficacy against viruses, such as poliovirus type 1 (Sabin) (supplied by US Centers for Disease Control and Prevention). As is known in the art, nonenveloped viruses are the most difficult to control or eradicate. Exemplary nonenveloped viruses include poliovirus type 1 (Sabin). Efficacy against poliovirus type 1 (Sabin) presumptively demonstrates efficacy against other bacteria and non-enveloped viruses, such as influenza A (H1N1: NR-13658), human adenovirus type 5 (American Type Culture Collection "ATCC" VR-5), feline calicivirus strain F-9 (ATCC VR-782), herpes simplex type 1 (ATCC VR1493), *Staphylococcus aureus* (ATCC 6538), *Escherichia coli* (ATCC 10536), *Pseudomonas aeruginosa* (ATCC 15442), *Enterococcus* hirae (ATCC 10541), *Aspergillis niger* (ATCC 16404), *Trichophyton metagropytes* (ATCC 9533), and *Mycobacterium tuberculosis* var. *bovis*. The formulations are expected to exhibit between approximately a 1 log 10 and approximately a 5 log 10 reduction against poliovirus type 1 (Sabin).

The following examples below illustrate exemplary formulations as well as preferred embodiments of the invention. It is to be understood that these examples are provided by way of illustration only and that further compositions and articles may be produced in accordance with the teachings of the present invention.

EXAMPLES

The compositions in the following examples were prepared using the ingredients identified in Table A:

TABLE A

| Abbr | CAS | Description |
|---|---|---|
| $H_2O$ | 7732-18-5 | Water |
| ABS | 68584-22-5 | Alkylbenzenesulfonic acid, sodium salt (96%) |

TABLE A-continued

| Abbr | CAS | Description |
|---|---|---|
| SLES | 68585-34-2 | Sodium Lauryl Ether Sulfate anionic surfactant, with 2 ethoxylate groups (27% w/w) |
| CFA | 67701-05-07 or 91788-47-5 | (C8-C18) and C18-unsaturated alkylcarboxylic acid, Coconut Fatty Acid, nonionic surfactant (100%) |
| EA 7EO | 68551-12-2 | C12-16 7EO Alcohol Ethoxylate nonionic surfactant, e.g., sold by Sasol as Novel 1412-7 (100%) |
| EA 3EO | 68002-97-1 | C10-16 3EO Alcohol Ethoxylate nonionic surfactant, e.g., sold by Sasol as Novel 1412-3 (100%) |
| EA 8EO | 64425-86-1 | C13-15 8EO Alcohol Ethoxylate nonionic surfactant, e.g., sold by BASF as Lutensol ® AO8 (100%) |
| FAA | N/A | Fatty alcohol alkoxylate, e.g., sold by BASF as Plurafac ® LF 300 (100%) |
| LB | 2372-82-9 | Bis (3-aminopropyl) dodecyl amine (90%) cationic biocide, e.g., sold by Lonza as Lonzabac ™ 12.100 |
| MB80 | 68424-85-1 | Alkyl dimethyl benzyl ammonium chloride (80%) cationic biocide, sold by Lonza as Barquat ® MB-80 |
| BKC | 8001-54-5 | Benzalkonium Chloride (80%) cationic biocide |
| BAC | 68428-85-1 | Benzylammonium Chloride (80%) cationic biocide, e.g., sold by Huntsman as Empigen ® BAC 80 |
| B2080 | 68424-95-3 | Alkyl dimethyl ammonium chloride (80%) cationic biocide, e.g., sold by Lonza as Bardac ® 2080 |
| B2280 | 7173-51-5 | Didecyl dimethyl ammonium chloride (80%) cationic biocide, e.g., sold by Lonza as Bardac ® 2280 |
| VIB | 27083-27-8 and 32289-58-0 | Poly(hexa methylene biguanide) hydrochloride (80%) polymeric biocide, e.g., sold by Lonza as Vantocil ® IB |
| Bet | 61789-40-0 or 70851-07-09 or 56-81-5 | Cocoamidopropyl Betaine (35%) amphoteric surfactant, contains 1-5% glycerin, e.g. sold by Solvay as Mackam ® 35, or sold by Galaxy Surfactants as Galaxy CAPB |
| LO | 1643-20-5 | Lauramine Oxide (30%) zwitterionic surfactant, e.g., sold by Stepan as Ammonyx ® LO-E |
| SS | 7647-14-5 | 20% NaCl Salt Solution |
| TEA | 102-71-6 | Triethanolamine (99%) |
| MEA | 141-43-5 | Monoethanolamine |
| GL45 | 51981-21-6 | L-glutamic acid N, N'-diacetic acid, tetrasodium salt (45%), e.g., sold by AkzoNobel as Dissolvine ® GL-45 |
| GL47 | 51981-21-6 | L-glutamic acid N, N'-diacetic acid, tetrasodium salt (47%), e.g., sold by AkzoNobel as Dissolvine ® GL-47 |
| Gly | 56-81-5 | Glycerine (99%) |
| Pro-E | N/A | Protease (10%), e.g., sold by DuPont as Effectenz ® P-150 |
| Pro-P | N/A | Protease (10%), e.g., sold by Novozymes as Progress Uno 101 L |
| Pro-S | N/A | Protease (10%), e.g., sold by Novozymes as Savinase ® 16.0 L EX |
| Amy | N/A | Amylase (10%), e.g., sold by Novozymes as Stainzyme ® 12 L |
| Mann | N/A | Mannanase (1%), e.g., sold by Nozozymes as Mannaway ® 4.0 L |
| MC | N/A | Proprietary blend of protease and amylase enzymes sold by Novozymes as Medley ® Core 200 L |
| CC | 9012-54-8 | Cellulase enzyme sold by Novozymes as Celluclean ® 5000 (7.5%) |
| XG | 11138-66-2 | Xanthan Gum, e.g. sold by Jungbunzlauer Suisse AG under the Grade XG FNCS having 80 mesh granulation and transparent |
| EtOH | 64-17-5 | Ethanol |
| PPG | 57-55-6 | Propylene Glycol |
| CR | 1384165-05-2 | Modified biopolymer sold by BASF under the trade name Coltide ™ Radiance LQ |
| CBS | N/A | 4,4'-distyryl biphenyl derivative, e.g., sold by BASF as Tinopal ® CBS-X CL |
| D | 28093213 | 1-hydroxyethylidene-1,1-diphosphonic acid, sold by Italmatch as Dequest ® FS |
| DTPMP | 22042-96-2 | Diethylenetriamine pentakis(methylphosphonic acid) soln (41.2%) Sold by Aquapharm Chemicals Pvt. Ltd as Aquacid 1068EX; sold by Italimak UK Ltd as Dequest 2066C2; sold by Giovanni Bozzetto as Sequinon 40NA 32C; sold by Zschimmer&Schwarz as Cublen D4217 |
| VB | 27344-41-8 | Disodium-4-4-bis-2-sulfostyryl-biphenyl, e.g., sold by Vesta Chemicals as Viobrite CBS or Dalian Richfortune Chemicals as FWA CBS-X |
| CA | 77-92-9 | Citric Acid, 50% |
| NaCit | 6132-04-3 | Sodium citrate dihydrate |
| F | Multiple | Fragrance |
| C | Multiple | Color |

Example 1

The formulations in Tables 1-3 do not include anionic surfactants, and most exhibit low viscosity.

TABLE 1

| Raw Material | E1 | E2 | E3 | E4 | E5 | E6 | E7 |
|---|---|---|---|---|---|---|---|
| $H_2O$ | 82.2782 | 92.1682 | 74.6782 | 85.3982 | 85.4 | 85.4 | 86.799 |
| CFA | 1.5 | 0 | 2.0 | 0 | 0 | 0 | 0 |
| EA 7EO | 5.0 | 0 | 10.0 | 7.0 | 7.0 | 7.0 | 6.0 |
| LB | 2.4 (2.16) | 0 | 2.5 (2.25) | 2.5 (2.25) | 2.5 (2.25) | 2.5 (2.25) | 2.5 (2.25) |
| BKC | 0 | 0 | 0.8 (0.64) | 0 | 0 | 0 | 0 |
| Bet | 1.5 (0.53) | 0 | 0 | 2.5 (0.88) | 2.5 (0.88) | 2.5 (0.88) | 2.0 (0.7) |
| SS | 2.2 (0.44) | 0 | 0 | 0 | 0 | 0 | 0 |
| TEA | 1.0 (0.99) | 0 | 5.5 (5.4) | 0 | 0 | 0 | 0 |
| MEA | 0 | 0.7 | 0 | 0 | 0 | 0 | 0 |
| GL45 | 2.1 (0.94) | 0 | 0 | 0 | 0 | | 0 |
| Gly | 1.5 (1.49) | 0 | 0 | 0 | 0 | 0 | 0 |
| Pro-E | 0 | 0 | 0.1 (0.01) | 0 | 0 | 0 | 0 |
| Pro-S | 0 | 0.9 (0.09) | 0 | 0.1 (0.01) | 0.1 (0.01) | 0.1 (0.01) | 0.1 (0.01) |
| Amy | 0 | 0 | 0 | 0 | 0 | 0 | 0.1 (0.01) |
| EtOH | 0 | 1.1 | 3.65 | 0 | 0 | 0 | 0 |
| PPG | 0.12 | 2.29 | 0.12 | 0 | 0 | 0 | 0 |
| VB | 0.1 | 0.5 | 0.5 | 0.1 | 0.1 | 0.1 | 0.1 |
| CA | 0 | 0 | 0 | 1.8 (0.9) | 1.8 (0.9) | 1.8 (0.9) | 1.8 (0.9) |
| NaCit | 0 | 3.0 | 0 | 0 | 0 | 0 | 0 |
| F | 0.6 | 0.6 | 0.6 | 0.6 | 0.6 | 0.6 | 0.6 |
| C | 0.0018 | 0.0018 | 0.0018 | 0.0018 | 0 | 0 | 0.0010 |
| Properties | Became opaque | Low viscosity | Low viscosity | pH 8.5* | pH 8.5* | pH 8.5* | pH 8.64 low viscosity CP <- 4° C. |

*Transparent with low viscosity
CP = Cloud Point

TABLE 2

| Raw Material | E8 | E16 | E18 | E17 | E20 | E22 |
|---|---|---|---|---|---|---|
| $H_2O$ | 85.359 | 88.799 | 90.449 | 71.789 | 72.719 | 78.449 |
| EA 7EO | 5.0 | 4.5 | 4.5 | 13.5 | 13.0 | 10.0 |
| LB | 2.5 (2.25) | 0 | 0 | 0 | 0 | 1.25 (1.13) |
| BAC | 0 | 0 | 0 | 0 | 2.5 (2) | 0 |
| B2280 | 0 | 0 | 0 | 0 | 0 | 1.25 (1) |
| VIB | 0 | 2.5 (2) | 2.5 (2) | 0 | 0 | 0 |
| Bet | 1.5 (0.53) | 1.5 (0.53) | 1.5 (0.53) | 8.0 (2.8) | 8.0 (2.8) | 5.5 (1.9) |
| LO | 3.0 (0.9) | 0 | 0 | 0 | 0 | 0 |
| TEA | 0 | 0 | 0.25 (0.25) | 0.31 (0.31) | 0.28 (0.28) | 0 |
| Gly | 0 | 0 | 0 | 3.0 (2.97) | 2.0 (1.98) | 1.8 (1.78) |
| Pro-S | 0.08 (0.008) | 0.1 (0.01) | 0.1 (0.01) | 0.1 (0.01) | 0.4 (0.04) | 0.1 (0.01) |
| Amy | 0.08 (0.008) | 0.1 (0.01) | 0.1 (0.01) | 0.1 (0.01) | 0.4 (0.04) | 0.1 (0.01) |
| VB | 0.8 | 0.1 | 0 | 0.1 | 0.1 | 0.1 |
| CA | 1.8 (0.9) | 1.8 (0.09) | 0 | 0 | 0 | 0.85 (0.43) |
| F | 0.6 | 0.6 | 0.6 | 0.6 | 0.6 | 0.6 |
| C | 0.0010 | 0.001 | 0.001 | 0.01 | 0.001 | 0.001 |
| Properties | *pH 8.73 low viscosity CP <- 4° C. | pH 8.10 120 cps CP <- 4° C. | pH 8.0 WL CP <- 4° C. | pH 7.79 105 cps CP <- 4 C. | pH 8.0 130 cps CP <- 4 C. | pH 8.28 2.5 cps CP <- 4 C. |

CP = Cloud Point
WL = water like, with viscosity between approximately 0 and approximately 10 cps
*Light residue on bottom after 12 days

TABLE 3

| Raw Material | E25 | E26 | E34 | E58 | E59 | E96 | E97 |
|---|---|---|---|---|---|---|---|
| $H_2O$ | 74.671 | 71.761 | 73.671 | 68.592 | 73.5644 | 63.9882 | 76.9682 |
| EA 7EO | 12.3 | 14.0 | 13.4 | 14.0 | 11.4 | 10.5 | 5.0 |
| EA 3EO | 0 | 0 | 0 | 5.38 | 4.3846 | 3.6 | 1.72 |
| EA 8EO | 0 | 0 | 0 | 0 | 0 | 7.0 | 3.0 |
| LB | 0 | 0 | 0 | 0 | 1.25 (1.13) | 0 | 0 |
| MB80 | 0 | 0 | 0 | 2.5 (2) | 1.25 (1) | 0 | 0 |
| B2080 | 2.5 (2) | 0 | 2.5 (2) | 0 | 0 | 2.2 (1.8) | 2.2 (1.8) |
| BAC | 0.0 | 2.5 (2) | 0 | 0 | 0 | 0 | 0 |
| Bet | 7.0 (2.5) | 8.0 (2.8) | 7.0 (2.5) | 7.0 (2.5) | 5.0 (1.8) | 6.5 (2.3) | 4.5 (1.6) |
| TEA | 0.278 (0.275) | 0.338 (0.334) | 0.278 (0.275) | 0.127 (0.126) | 0.0 | 0.21 (0.21) | 0.21 (0.21) |
| Gly | 2.0 (1.98) | 2.0 (1.98) | 2.0 (1.98) | 2.0 (1.98) | 2.0 (1.98) | 3.5 (3.5) | 3.5 (3.5) |
| Pro-S | 0.35 (0.035) | 0.4 (0.04) | 0.35 (0.035) | 0 | 0 | 0 | 0 |
| Amy | 0.2 (0.02) | 0.4 (0.04) | 0.2 (0.02) | 0.4 (0.04) | 0 | 0 | 0 |
| Mann | 0 | 0 | 0 | 0 | 0 | 0.4 (0.004) | 0.6 (0.006) |
| MC | 0 | 0 | 0 | 0 | 0 | 1.0 (0.17) | 1.2 (0.2) |
| VB | 0.1 | 0.0 | 0 | 0 | 0 | 0 | 0 |
| CBS | 0 | 0 | 0 | 0 | 0 | 0.5 (0.075) | 0.5 (0.075) |
| CA | 0 | 0 | 0 | 0 | 0.85 (0.425) | 0 | 0 |
| F | 0.6 | 0.6 | 0.6 | 0 | 0 | 0.6 | 0.6 |
| C | 0.001 | 0.001 | 0.001 | 0.001 | 0.001 | 0.0018 | 0.0018 |
| Properties | *pH 8.0<br>30 cps<br>CP <- 4° C. | pH 8.0<br>30 cps<br>CP <- 4° C. | pH 8.0<br>30 cps<br>CP <- 4° C. | pH 7.7<br>1017 cps<br>CP <- 4° C. | pH 8.01<br>162 cps<br>CP <- 4° C. | 690 cps | 690 cps |

CP = Cloud Point
*After 6 weeks, opaque at 5° C., ok at other temps

Example 2

In Table 4, anionic surfactant was added to formulations containing benzylammonium chloride (BAC), alkyl dimethyl ammonium chloride (B2280), or alkyl dimethyl benzyl ammonium chloride (MB80) cationic biocides and less than 10% w/w of an alkyl ethoxylate nonionic surfactant.

TABLE 4

| Raw Material | E11 | E14 | E32 | E51 |
|---|---|---|---|---|
| $H_2O$ | 76.779 | 86.399 | 75.07 | 75.839 |
| SLES (27%) | 4.0 (1.08) | 2.2 (0.59) | 3.0 (0.81) | 3.0 (0.81) |
| EA 7EO | 7.0 | 4.0 | 9.4 | 9.4 |
| BAC | 3.5 (2.8) | 0 | 0 | 0 |
| B2280 | 0 | 2.5 (2) | 0 | 0 |
| MB80 | 0 | 0 | 2.5 (2.0) | 2.5 (2.0) |
| Bet | 5.0 (1.75) | 1.0 (0.35) | 6.5 (2.3) | 6.5 (2.3) |
| TEA | 0.22 (0.22) | 0 | 0.23 (0.23) | 0.16 (0.16) |
| Gly | 2.0 (1.98) | 1.0 (0.99) | 2.0 (1.98) | 2.0 (1.98) |
| Pro-S | 0.4 (0.04) | 0.2 (0.02) | 0.3 (0.03) | 0.3 (0.03) |
| Amy | 0.4 (0.04) | 0.2 (0.02) | 0.3 (0.03) | 0.3 (0.03) |
| VB | 0.1 | 0.1 | 0 | 0 |
| CA | 0 | 1.8 (0.9) | 0 | 0 |
| F* | 0.6 | 0.6 | 0.6 | 0 |
| C** | 0.001 | 0.001 | 0.1 | 0.001 |
| Properties | pH 8.06<br>83.5 cps<br>CP < −4° C.<br>ppt* | pH 8.10<br>110 cps<br>CP < −4° C. | pH 8.13<br>248 cps<br>CP < 4° C. | PH 7.7<br>22 cps<br>CP < −4° C.<br>ppt2* |

*the same fragrance was used in E11 and E32
**the same color was used in all formulations
ppt*-precipitation occurred after 12 days
ppt2*-precipitation at low temperatures One of ordinary skill in the art will recognize that fragrance compositions frequently include stabilizers. The different properties obtained for the very similar E32 and E51 formulations may be explained by this difference.

Cloud point testing was performed on these samples. The formulations were placed in a cold liquid to determine when the solution turns opaque. The temperature at which the formulation exhibited a cloudy appearance (CP) was below −4° C. for these formulations, which is a sign of stability. A cloudy appearance at room temperature may be a sign of instability. Additionally, consumers prefer formulations that are not cloudy. As a result, the clarity of these formulations would be suitable for consumers.

Both BAC and MB80 contain benzyl functional groups. Applicants believe that cationic biocides that have these benzyl functional groups may accelerate precipitation in formulations that also contain anionic surfactants, such as SLES. This theory is supported by Table 4 above, in which precipitation was only observed for the formulations containing BAC and MB80. Formulations containing B2280 did not exhibit precipitation.

Based on these results, Applicants believe that suitable formulations may be obtained from:

a) a cationic biocide, an amphoteric surfactant, a nonionic surfactant, and an anionic surfactant, wherein the nonionic surfactant is the predominant surfactant; or b) 0.5-1.5 active % w/w anionic surfactant, preferably SLES; 4-10% w/w nonionic surfactant, preferably EA, 7EO; and 1-3% active w/w of a cationic biocide which does not contain any aromatic ligands, such as B2080. The formulation may further comprise 0.25-2.5 active % w/w of an amphoteric surfactant, such as Bet.

Example 3

In Table 5, anionic surfactant was added to formulations containing bis(3-aminopropyl) dodecyl amine (LB) cationic biocides and less than 10% w/w of alcohol ethoxylate nonionic surfactants.

TABLE 5

| Raw Material | E9 | E10 | E13 | E24 | E27 | E49 |
|---|---|---|---|---|---|---|
| $H_2O$ | 84.3982 | 86.5982 | 83.899 | 86.268 | 86.999 | 86.675 |
| SLES (27%) | 2.5 (0.68) | 2.2 (0.59) | 2.2 (0.59) | 2.2 (0.59) | 2.2 (0.59) | 2.2 (0.59) |
| EA 7EO | 5.7 | 4.0 | 4.0 | 4.0 | 4.0 | 4.0 |
| LB | 1.8 (1.6) | 2.3 (2.1) | 5.0 (4.5) | 2.5 (2.3) | 2.5 (2.3) | 2.5 (2.3) |
| Bet | 1.5 (0.53) | 1.0 (0.35) | 1.0 (0.35) | 1.0 (0.35) | 1.0 (0.35) | 1.0 (0.35) |
| Gly | 1.0 (0.99) | 1.0 (0.99) | 1.0 (0.99) | 1.0 (0.99) | 1.0 (0.99) | 1.0 (0.99) |
| Pro-S | 0.3 (0.03) | 0.2 (0.02) | 0.2 (0.02) | 0.2 (0.02) | 0.2 (0.02) | 0.2 (0.02) |
| Amy | 0.3 (0.03) | 0.2 (0.02) | 0.2 (0.02) | 0.2 (0.02) | 0.2 (0.02) | 0.2 (0.02) |
| VB | 0.1 | 0.1 | 0.1 | 0.1 | 0.1 | 0.1 |
| CA | 1.8 (0.9) | 1.8 (0.9) | 1.8 (0.9) | 1.93 (0.97) | 1.8 (0.9) | 2.124 (1.062) |
| F* | 0.6 | 0.6 | 0.6 | 0.6 | 0 | 0 |
| C** | 0.0018 | 0.0018 | 0.001 | 0.0018 | 0.001 | 0.001 |
| Properties | pH 7.33 low viscosity CP <- 4° C. ppt* | pH 8.38 low viscosity CP <- 4° C. ppt* | pH 8.10 100 cps CP <- 4° C. | pH 8.0 100 cps CP <- 4 C. ppt** | pH 8.0 30 cps CP <- 4 C. | pH 8.28 WL Mild precip after 1 wk |

*the same fragrance was used in E9, E10, E13, and E24

*the same color was used in E9 and E10; the same color was used in E13, E24, E27, and E49, and this color differed from that of E9 and E10 ppt* = precipitation occurred after 12 days ppt** = precipitate in 5° C. stability sample and color change in 40° C. and 50° C. samples after 6 weeks WL = water like Cloud point testing was performed on E9, E10, E13, E24, and E27. The formulations were placed in a cold liquid to determine when the solution turns opaque. The temperature at which the formulation exhibited a cloudy appearance (CP) was below −4° C. for these formulations, which is a sign of stability. A cloudy appearance at room temperature may be a sign of instability. Additionally, consumers prefer formulations that are not cloudy. As a result, the clarity of these formulations would be suitable for consumers These formulations exhibited low viscosity and precipitation in samples E9, E10, E24, and E49. These phenomena are not usually acceptable to consumers.

Based on these results, Applicants believe that suitable formulations may be obtained from 0.5-1.5 active % w/w anionic surfactant, preferably SLES; 4-10% w/w nonionic surfactant, preferably EA, 7EO; and 1-5% active w/w of a cationic biocide which does not contain any aromatic ligands, such as LB. The formulation may further comprise 0.25-1 active % w/w of an amphoteric surfactant, such as Bet.

Example 4

In Table 6, anionic surfactant was added to formulations containing poly(hexa methylene biguanide) hydrochloride biocide (VIB) and less than 10% w/w of an alkyl ethoxylate nonionic surfactant.

TABLE 6

| Raw Material | E15 | E19 |
|---|---|---|
| $H_2O$ | 86.399 | 86.599 |
| SLES | 2.2 (0.59) | 2.2 (0.59) |
| EA 7EO | 4.0 | 4.0 |
| VIB | 2.5 (2) | 2.4 (1.9) |
| Bet | 1.0 (0.35) | 1.0 (0.35) |
| TEA | 0 | 0 |
| Gly | 1.0 (0.99) | 1.0 (0.99) |

TABLE 6-continued

| Raw Material | E15 | E19 |
|---|---|---|
| Pro-S | 0.2 (0.02) | 0.2 (0.02) |
| Amy | 0.2 (0.02) | 0.2 (0.02) |
| VB | 0.1 | 0 |
| CA | 1.8 (0.9) | 1.8 (0.9) |
| F* | 0.6 | 0.6 |
| C* | 0.001 | 0.001 |
| Properties | pH 8.10 110 cps CP < −4° C. | pH 7.85 107 cps CP < −4° C. |

Cloud point testing was performed on these samples. The formulations were placed in a cold liquid to determine when the solution turns opaque. The temperature at which the formulation exhibited a cloudy appearance (CP) was below −4° C. for these formulations, which is a sign of stability. A cloudy appearance at room temperature may be a sign of instability. Additionally, consumers prefer formulations that are not cloudy. As a result, the clarity of these formulations would be suitable for consumers.

These formulations exhibited low viscosity.

Based on these results, Applicants believe that suitable formulations may be obtained from 0.5-1.5 active % w/w anionic surfactant, preferably SLES; 4-10% w/w nonionic surfactant, preferably EA, 7EO; and 1-5% active w/w, preferably 1-3% active w/w, of a biocide, such as VIB. The formulation may further comprise 0.25-1 active % w/w of an amphoteric surfactant, such as Bet.

Example 5

In Tables 7 and 8, anionic surfactant was added to formulations containing cationic biocides and 10% w/w or more of alcohol ethoxylate nonionic surfactants.

TABLE 7

| Raw Material | E148 | E12 | E21 | E28 | E33 |
|---|---|---|---|---|---|
| $H_2O$ | 49.9982-50.5 | 73.2790 | 69.569 | 71.061 | 70.921 |
| SLES | 10 (2.7) | 5.0 (1.35) | 5.0 (1.35) | 2.2 (0.59) | 2.0 (0.54) |
| EA 7EO | 24.1 | 10.0 | 13.0 | 12.5 | 14.0 |
| B2080 | 2.2 (1.76) | 0 | 0 | 0 | 0 |
| BAC | 0 | 3.0 (2.4) | 2.5 (2) | 2.5 (2) | 2.5 (2) |
| Bet | 7 (2.45) | 5.0 (1.75) | 6.5 (2.3) | 8.0 (2.8) | 8.0 (2.8) |
| TEA | 1.5 (1.485) | 0.22 (0.22) | 0.23 (0.23) | 0.338 (0.334) | 0.278 (0.275) |
| Gly | 0 | 2.0 (1.98) | 2.0 (1.98) | 2.0 (1.98) | 1.0 (0.99) |
| Pro-P | 0.85 | 0.4 (0.04) | 0 | 0 | 0 |
| Pro-S | 0 | 0 | 0.3 (0.03) | 0.4 (0.04) | 0.45 (0.045) |
| Amy | 0.25 | 0.4 (0.04) | 0.3 (0.03) | 0.4 (0.04) | 0.25 (0.025) |
| Mann | 0.2 | 0 | 0 | 0 | 0 |
| DTPMP | 3.4 (1.4) | 0 | 0 | 0 | 0 |
| VB | 0 | 0.1 | 0 | 0 | 0 |
| CA | 0 | 0 | 0 | 0 | 0 |
| F* | 0-0.5 | 0.6 | 0.6 | 0.6 | 0.6 |
| C* | 0.0018 | 0.001 | 0.001 | 0.001 | 0.001 |
| Properties | pH 8.00-8.50 250-400 cps CP < −3 | pH 8.10 170 cps CP < −4° C. ppt* | pH 8.13 248 cps CP < −4° C. CC* | 150 cps | 130 cps |

*Except for E148, the same color and fragrance were used in all the formulations ppt*-precipitation occurred after 12 days cc** = After 6 weeks, color has changed at 5° C.

TABLE 8

| Raw Material | E23 | E29 | E31 | E48 |
|---|---|---|---|---|
| $H_2O$ | 77.039 | 77.649 | 71.57 | 77.615 |
| SLES | 2.5 (0.68) | 2.2 (0.59) | 5.0 (1.4) | 2.5 (0.68) |
| EA 7EO | 10.0 | 10.8 | 13.0 | 10.0 |
| LB | 1.25 (1.13) | 1.25 (1.13) | 0 | 1.25 (1.13) |
| BAC | 1.25 (1) | 0 | 0 | 0 |
| B2080 | 0 | 0 | 2.0 (1.6) | 0 |
| MB80 | 0 | 0 | 0 | 1.25 (1) |
| Bet | 4.0 (1.4) | 4.0 (1.4) | 6.0 (2.1) | 4.0 (1.4) |
| TEA | 0 | 0 | 0.23 (0.23) | |
| Gly | 2.0 (1.98) | 1.0 (0.99) | 1.0 (0.99) | 2.0 (1.98) |
| Pro-S | 0.2 (0.02) | 0.4 (0.04) | 0.3 (0.03) | 0.2 (0.02) |
| Amy | 0.2 (0.02) | 0.2 (0.02) | 0.2 (0.02) | 0.2 (0.02) |
| VB | 0 | 0.1 | 0 | 0 |
| CA | 0.96 (0.48) | 1.8 (0.9) | 0 | 0.984 (0.492) |
| F* | 0.6 | 0.6 | 0.6 | 0 |
| C** | 0.001 | 0.001 | 0.1 | 0.001 |
| Properties | pH 8.07 2.5 cps CP < −4° C. ppt* | 150 cps | 170 cps | pH 8.01 WL CP < −4° C. ppt** |

*E23 and E31 used the same fragrance

**the same color was used in all of these formulations ppt* = After 6 weeks, precipitate in the 30 C. and 50 C. stability samples ppt** = precipitation at 5° C.

Cloud point testing was performed on E12, E21, E23, and E48. The formulations were placed in a cold liquid to determine when the solution turns opaque. The temperature at which the formulation exhibited a cloudy appearance (CP) was below −4° C. for these formulations, which is a sign of stability. A cloudy appearance at room temperature may be a sign of instability. Additionally, consumers prefer formulations that are not cloudy. As a result, the clarity of these formulations would be suitable for consumers.

Except for E32, the viscosity of E12, E21, E28, E29, E31, and E33 is higher than those in Examples 2-4. Consumers prefer laundry detergents having a viscosity ranging from approximately 180 cps to approximately 750 cps, preferably from approximately 200 cps to approximately 500 cps as measured by a Brookfield viscometer using spindle S31 at 20° C. and 20 rpm.

As can be seen, color change occurs in E21 and precipitation occurs in E12, E23, and E48. These phenomena are not usually acceptable to consumers.

Based on these results, Applicants believe that suitable formulations may be obtained from:

a) a cationic biocide, an amphoteric surfactant, a nonionic surfactant, and an anionic surfactant, wherein the nonionic surfactant is the predominant surfactant;

b) 0.25-1 active % w/w anionic surfactant, preferably SLES; 12-15% w/w nonionic surfactant, preferably EA 7EO; and 1-5% active w/w, preferably 1-3% active w/w of a cationic biocide having benzyl functional groups, such as BAC or MB80. The formulation may further comprise 1.5-3.5 active % w/w of an amphoteric surfactant, such as Bet; or c) 0.5-2 active % w/w anionic surfactant, preferably SLES; 11-15% w/w nonionic surfactant, preferably EA 7EO; and 0.5-5% active w/w, preferably 0.5-3% active w/w of a cationic biocide which does not contain any aromatic functional groups, such as LB or B2080. The formulation may further comprise 1.5-3.5 active % w/w of an amphoteric surfactant, such as Bet.

Example 6

In Tables 9-11, anionic surfactant was added to formulations containing a bis(3-aminopropyl) dodecyl amine (LB) cationic biocide and blend of alcohol ethoxylate nonionic surfactants.

TABLE 9

| Raw Material | E37 | E40 | E46 | E36 | E44 | E45 |
|---|---|---|---|---|---|---|
| $H_2O$ | 80.349 | 80.369 | 80.349 | 77.899 | 80.679 | 77.899 |
| SLES | 2.0 (0.54) | 2.0 (0.54) | 2.0 (0.54) | 3.0 (0.81) | 1.0 (0.27) | 3.0 (0.81) |
| EA 7EO | 6.5 | 6.5 | 6.5 | 7.0 | 7.0 | 7.0 |
| EA 3EO | 2.5 | 2.5 | 2.5 | 2.7 | 2.69 | 2.7 |
| LB | 1.85 (1.67) | 1.85 (1.67) | 1.85 (1.67) | 1.6 (1.4) | 1.85 (1.67) | 1.6 (1.4) |
| Bet | 3.0 (1.1) | 3.0 (1.1) | 3.0 (1.1) | 4.0 (1.4) | 3.0 (1.1) | 4.0 (1.4) |
| Gly | 1.0 (0.99) | 1.0 (0.99) | 1.0 (0.99) | 1.0 (0.99) | 1.0 (0.99) | 1.0 (0.99) |
| Pro-P | 0 | 0 | 0 | 0 | 0 | 0 |
| Amy | 0.3 (0.03) | 0.3 (0.03) | 0.3 (0.03) | 0.3 (0.03) | 0.3 (0.03) | 0.3 (0.03) |
| VB | 0.1 | 0.08 | 0.1 | 0.1 | 0.08 | 0.1 |
| CA | 1.8 (0.9) | 1.8 (0.9) | 1.8 (0.9) | 1.8 (0.9) | 1.8 (0.9) | 1.8 (0.9) |
| F* | 0.6 | 0.6 | 0.6 | 0.6 | 0.6 | 0.6 |
| C* | 0.001 | 0.001 | 0.001 | 0.001 | 0.001 | 0.001 |
| Ratio EA 7EO:EA 3EO | 2.6:1 | 2.6:1 | 2.6:1 | 2.59:1 | 2.6:1 | 2.59:1 |
| Properties | pH 8.0 180 cps | 250 cps | 170 cps | pH 8.0 180 cps | 170 cps | 170 cps |

*the same color and fragrance were used in all of these formulations

TABLE 10

| Raw Material | E61 | E54 | E30 | E43 | E50 | E55 |
|---|---|---|---|---|---|---|
| $H_2O$ | 79.079 | 78.839 | 77.699 | 77.699 | 78.521 | 77.349 |
| SLES | 2.2 (0.59) | 2.1 (0.57) | 2.2 (0.59) | 2.2 (0.59) | 2.2 (0.59) | 2.2 (0.59) |
| EA 7EO | 7.0 | 7.5 | 7.75 | 7.75 | 7.75 | 7.75 |
| EA 3EO | 2.65 | 2.88 | 3.0 | 3.0 | 3.0 | 3.0 |
| LB | 1.8 (1.6) | 1.8 (1.6) | 1.25 (1.13) | 1.8 (1.6) | 1.25 (1.13) | 1.8 (1.6) |
| Bet | 3.5 (1.2) | 3.5 (1.2) | 4.0 (1.4) | 4.0 (1.4) | 4.0 (1.4) | 4.0 (1.4) |
| TEA | 0.4 (0.04) | 0 | 0 | 0.47 (0.47) | 0 | 0 |
| Gly | 1.0 (0.99) | 1.0 (0.99) | 1.0 (0.99) | 1.0 (0.99) | 1.0 (0.99) | 1.0 (0.99) |
| Pro-P | 0.4 (0.04) | 0 | 0 | 0 | 0 | 0 |
| Pro-S | 0 | 0 | 0.4 (0.04) | 0 | 0.4 (0.04) | 0 |
| Amy | 0.2 (0.02) | 0.2 (0.02) | 0.2 (0.02) | 0.2 (0.02) | 0.2 (0.02) | 0.2 (0.02) |
| VB | 0 | 0.08 | 0.1 | 0.1 | 0.1 | 0.1 |
| CA | 1.57 (0.785) | 1.5 (0.75) | 1.8 (0.9) | 1.18 (0.59) | 0.978 (0.489) | 2.0 (1.0) |
| F* | 0.6 | 0.6 | 0.6 | 0.6 | 0.6 | 0.6 |
| C* | 0.001 | 0.001 | 0.001 | 0.001 | 0.001 | 0.001 |
| Ratio EA 7EO:EA 3EO | 2.64:1 | 2.6:1 | 2.58:1 | 2.58:1 | 2.58:1 | 2.58:1 |
| Properties | 190 cps | pH 8.2 70 cps | 170 cps | 210 cps | pH 8.08 73 cps CP-2° C. Ok after 1 week | pH 8.0 75 cps |

*the same color and fragrance were used in all of these formulations

TABLE 11

| Raw Material | E56 | E57 | E60 | E38 | E39 |
|---|---|---|---|---|---|
| $H_2O$ | 78.321 | 77.579 | 77.5773 | 75.849 | 74.879 |
| SLES | 2.2 (0.59) | 2.2 (0.59) | 2.2 (0.59) | 4.0 (1.1) | 4.0 (1.1) |
| EA 7EO | 7.75 | 7.75 | 7.75 | 8.0 | 8.0 |
| EA 3EO | 3.0 | 3.0 | 3.0 | 3.0 | 3.0 |
| LB | 1.25 (1.13) | 1.8 (1.6) | 1.8 (1.6) | 1.25 (1.13) | 1.25 (1.13) |
| Bet | 4.0 (1.4) | 4.0 (1.4) | 4.0 (1.4) | 4.0 (1.4) | 4.0 (1.4) |
| TEA | 0.2 (0.2) | 0.2 (0.2) | 0.2 (0.2) | 0 | 0 |
| Gly | 1.0 (0.99) | 1.0 (0.99) | 1.0 (0.99) | 1.0 (0.99) | 2.0 (1.98) |
| Pro-S | 0.4 (0.04) | 0 | 0 | 0 | 0 |

TABLE 11-continued

| Raw Material | E56 | E57 | E60 | E38 | E39 |
|---|---|---|---|---|---|
| Amy | 0.2 (0.02) | 0.2 (0.02) | 0.2 (0.02) | 0.4 (0.04) | 0.37 (0.037) |
| CBS | 0.1 | 0.1 | 0.1 | 0.1 | 0.1 |
| CA | 0.978 (0.489) | 1.57 (0.785) | 1.57 (0.785) | 1.8 (0.9) | 1.8 (0.9) |
| F* | 0.6 | 0.6 | 0.6 | 0.6 | 0.6 |
| C* | 0.001 | 0.001 | 0.001 | 0.001 | 0.001 |
| Ratio EA 7EO:EA 3EO | 2.58:1 | 2.58:1 | 2.58:1 | 2.67:1 | 2.67:1 |

TABLE 11-continued

| Raw Material | E56 | E57 | E60 | E38 | E39 |
|---|---|---|---|---|---|
| Properties | pH 8.08<br>73 cps<br>CP-2° C.<br>OK after<br>1 wk | pH 8.0<br>60 cps | 190 cps | pH 8.15<br>240 cps | pH 8.15<br>240 cps |

*the same color and fragrance were used in all of these formulations

Consumers prefer laundry detergents having a viscosity ranging from approximately 180 cps to approximately 750 cps, preferably from approximately 200 cps to approximately 500 cps, as measured by a Brookfield viscometer using spindle S31 at 20° C. and 20 rpm. Except for E50 and E54-57, the viscosities of these formulations are either close to or in the desired viscosity range. Applicants have discovered that the order in which the surfactants are added to the formulation may affect viscosity. The cationic biocide should be added to a solution containing the amphoteric surfactant, but prior to addition of the anionic and nonionic surfactants. The low viscosity results of Examples E50 and E54-E57, may be due to adding the cationic biocide to the formulation after all of the other surfactants have been added to the formulation.

Based on these results, Applicants believe that suitable formulations may be obtained from a a) a cationic biocide, an amphoteric surfactant, a nonionic surfactant, and an anionic surfactant, wherein the nonionic surfactant is the predominant surfactant;

b) a cationic biocide, an amphoteric surfactant, a nonionic surfactant, and an anionic surfactant, wherein the composition has a viscosity ranging from approximately 200 cps to approximately 500 cps as measured by a Brookfield viscometer using spindle S31 at 20° C. and 20 rpm;

c) a cationic biocide, a betaine, a nonionic surfactant, and an anionic surfactant, wherein the nonionic surfactant is a mixture of EA 7EO and EA 3EO having a ratio ranging from approximately 2.3 to approximately 2.9;

d) a cationic biocide, a betaine, a nonionic surfactant, and an anionic surfactant, wherein the nonionic surfactant is a mixture of EA 7EO and EA 3EO having a ratio of approximately 2.6;

e) a cationic biocide, a betaine, a C10-C16 7 ethoxylated alcohol, a C10-16 3 ethoxylated alcohol, and the sodium salt of a C12-14 ethoxylated alkyl ether sulfate;

f) a cationic biocide, cocamidopropyl betaine, a C10-C16 7 ethoxylated alcohol, a C10-16 3 ethoxylated alcohol, and the sodium salt of a C12-14 ethoxylated alkyl ether sulfate;

g) 0.1-1.5 active % w/w, preferably 0.5-1.5 active % w/w anionic surfactant, preferably SLES; 8-15% w/w of a nonionic surfactant blend, preferably EA 7EO and EA 3EO; and 1-5% active w/w, preferably 1-2% active w/w of a cationic biocide that does not contain benzyl functional groups, such as LB. The formulation may further comprise 1-2 active % w/w of an amphoteric surfactant, such as Bet;

j) 0.1-1.5 active % w/w, preferably 0.5-1.5 active % w/w anionic surfactant, preferably SLES; 8-15% w/w of a nonionic surfactant blend, preferably EA 7EO and EA 3EO; and 1-5% active w/w, preferably 1-2% active w/w of a cationic biocide that does not contain benzyl functional groups, such as LB, wherein EA 7EO and EA 3EO have a ratio ranging from approximately 2.3 to approximately 2.9. The formulation may further comprise 1-2 active % w/w of an amphoteric surfactant, such as Bet; or k) 0.1-1.5 active % w/w, preferably 0.5-1.5 active % w/w anionic surfactant, preferably SLES; 8-15% w/w of a nonionic surfactant blend, preferably EA 7EO and EA 3EO; and 1-5% active w/w, preferably 1-2% active w/w of a cationic biocide that does not contain benzyl functional groups, such as LB, wherein EA 7EO and EA 3EO have a ratio of approximately 2.6. The formulation may further comprise 1-2 active % w/w of an amphoteric surfactant, such as Bet.

Example 7

In Table 12, anionic surfactant was added to formulations containing alkyl dimethyl ammonium chloride cationic biocides and a blend of alcohol ethoxylate nonionic surfactants.

TABLE 12

| Raw Material | E141* | E145 | E148 |
|---|---|---|---|
| $H_2O$ | 62.16 | 62.3382 | 65.1692 |
| SLES | 5<br>(1.35) | 5<br>(1.35) | 1.929<br>(0.52) |
| EA 7EO | 8.1 | 8.1 | 8.1 |
| EA 8EO | 10 | 10.0 | 10.0 |
| Gly | 2.2<br>(2.2) | 2.2<br>(2.2) | 2.2<br>(2.2) |
| Bet | 7.0<br>(2.5) | 7.0<br>(2.5) | 7.0<br>(2.5) |
| B2080 | 2.2<br>(1.8) | 2.2<br>(1.8) | 2.2<br>(1.8) |
| GL47 | 1.7<br>(0.799) | 1.7<br>(0.799) | 1.7<br>(0.799) |
| CBS | 0.1 | 0.1 | 0.1 |
| Mann | 0.2<br>(0.002) | 0.2<br>(0.002) | 0.2<br>(0.002) |
| MC | 0.5<br>(0.085) | 0.5<br>(0.085) | 0.5<br>(0.085) |
| CC | 0 | 0.4<br>(0.02) | 0 |
| CA | 0.06<br>(0.03) | 0.06<br>(0.03) | 0.3<br>(0.15) |
| F | 0.6 | 0.6 | 0.6 |
| C | 0.18 | 0.18 | 0.0018 |
| | 507 cps | 480 cps | 225 cps |

*Samples of E141 underwent 12 week stability testing at 5° C., 25° C., 30° C. with 60% relative humidity, and 40° C. with 75% relative humidity. None of the samples exhibited any change in colour, cloudiness or phase separation. The viscosity remained within 10% of the initial viscosity for all of the samples. The pH of the samples stored at 5° C. and 25° C. remained within 10% of the initial pH (measured on a 5% w/w solution). A larger pH decrease occurred for the higher temperature samples.

Consumers prefer laundry detergents having a viscosity ranging from approximately 180 cps to approximately 750 cps, preferably from approximately 200 cps to approximately 500 cps, as measured by a Brookfield viscometer using spindle S31 at 20° C. and 20 rpm. The viscosities of these formulations are in the desired viscosity range.

Based on these results, Applicants believe that superior formulations may be obtained from:

a) a cationic biocide, a betaine, a nonionic surfactant, and an anionic surfactant, wherein the nonionic surfactant is the predominant surfactant;

b) a cationic biocide, a betaine, a nonionic surfactant, and an anionic surfactant, wherein the composition has a viscosity ranging from approximately 200 cps to approximately 500 cps as measured by a Brookfield viscometer using spindle S31 at 20° C. and 20 rpm;

c) a cationic biocide, a betaine, a nonionic surfactant, and an anionic surfactant, wherein the nonionic surfactant is a mixture of EA 7EO and EA 8EO;

d) a cationic biocide, a betaine, a C10-C16 7 ethoxylated alcohol, a C13-15 8 ethoxylated alcohol, and the sodium salt of a C12-14 ethoxylated alkyl ether sulfate;
e) a cationic biocide, cocamidopropyl betaine, a C10-C16 7 ethoxylated alcohol, a C13-15 8 ethoxylated alcohol, and the sodium salt of a C12-14 ethoxylated alkyl ether sulfate; or
f) 0.1-1.5 active % w/w, preferably 0.5-1.5 active % w/w anionic surfactant, preferably SLES; 15-20% w/w of a nonionic surfactant blend, preferably EA 7EO and EA 8EO; and 1-5% active w/w, preferably 1-2% active w/w of a cationic biocide that does not contain benzyl functional groups, such as B2080. The formulation may further comprise 2-3 active % w/w of an amphoteric surfactant, such as Bet.

Example 8

In Tables 13-16, anionic surfactant was added to formulations containing alkyl dimethyl ammonium chloride cationic biocides and a blend of alcohol ethoxylate nonionic surfactants.

TABLE 13

| Raw Material | E41 | E42 | E52 | E62 | E65 | E71 |
|---|---|---|---|---|---|---|
| $H_2O$ | 71.48 | 71.031 | 71.519 | 72.119 | 73.88 | 70.8390 |
| SLES | 5.0 (1.4) | 1.0 (0.27) | 1.0 (0.27) | 1.0 (0.27) | 1.0 (0.27) | 1.0 (0.27) |
| EA 7EO | 8.8 | 10.5 | 10.5 | 10.5 | 10.5 | 10.5 |
| EA 3EO | 3.38 | 3.6 | 3.6 | 3.6 | 3.6 | 3.6 |
| B2080 | 2.0 (1.6) | 2.2 (1.8) | 2.2 (1.8) | 2.2 (1.8) | 2.2 (1.8) | 3.1 (2.5) |
| Bet | 6.0 (2.1) | 6.5 (2.3) | 6.5 (2.3) | 6.5 (2.3) | 6.5 (2.3) | 6.5 (2.3) |
| TEA | 0.23 (0.23) | 0.21 (0.21) | 0.23 (0.23) | 0.23 (0.23) | 0.21 (0.21) | 0.21 (0.21) |
| Gly | 2.0 (1.98) | 3.5 (3.5) | 3.5 (3.5) | 3.5 (3.5) | 1.0 (0.99) | 3.5 (3.5) |
| CBS | 0 | 0.5 | 0 | 0 | 0 | 0.0 |
| Pro-S | 0.3 (0.03) | 0 | 0.2 (0.02) | 0.35 (0.035) | 0 | 0 |
| Pro-P | 0.0 | 0.2 (0.02) | 0 | 0 | 0.3 (0.03) | 0.2 (0.02) |
| Amy | 0.2 (0.02) | 0.15 (0.015) | 0.15 (0.015) | 0 | 0.2 (0.02) | 0.15 (0.015) |
| F* | 0.6 | 0.6 | 0.6 | 0 | 0.6 | 0.4 |
| C** | 0.01 | 0.0018 | 0.001 | 0.001 | 0.01 | 0.001 |
| Ratio EA 7EO:EA 3EO | 2.6:1 | 2.9:1 | 2.9:1 | 2.9:1 | 2.9:1 | 2.9:1 |
| Properties | Turbid too high % SLES | 210 cps | pH 7.47 207 cps CP <- 4° C. ok after 1 week | 180 cps ok after 1 week | 210 cps | 210 cps |

*the same fragrance was used in E41, E42, E65, and E71

**the same color was used in all of these formulations

TABLE 14

| Raw Material | E72 | E73 | E74 | E76 | E77 | E78 |
|---|---|---|---|---|---|---|
| $H_2O$ | 71.5382 | 71.4382 | 70.9882 | 71.0382 | 71.0382 | 71.0382 |
| SLES | 1.0 (0.27) | 1.0 (0.27) | 1.0 (0.27) | 1.0 (0.27) | 1.0 (0.27) | 1.0 (0.27) |
| EA 7EO | 10.5 | 10.5 | 10.5 | 10.5 | 10.5 | 10.5 |
| EA 3EO | 3.6 | 3.6 | 3.6 | 3.6 | 3.6 | 3.6 |
| B2080 | 2.2 (1.8) | 2.2 (1.8) | 2.2 (1.8) | 2.2 (1.8) | 2.2 (1.8) | 2.2 (1.8) |
| Bet | 6.5 (2.3) | 6.5 (2.3) | 6.5 (2.3) | 6.5 (2.3) | 6.5 (2.3) | 6.5 (2.3) |
| TEA | 0.21 (0.21) | 0.21 (0.21) | 0.21 (0.21) | 0.21 (0.21) | 0.21 (0.21) | 0.21 (0.21) |
| Gly | 3.5 (3.5) | 3.5 (3.5) | 3.5 (3.5) | 3.5 (3.5) | 3.5 (3.5) | 3.5 (3.5) |
| CBS | 0 | 0.1 | 0.1 | 0.5 | 0 | 0.5 |
| CR | 0 | 0 | 0 | 0 | 0.5 | 0 |
| Pro-P | 0.2 (0.02) | 0.2 (0.02) | 0.35 (0.035) | 0.2 (0.02) | 0.2 (0.02) | 0.2 (0.02) |
| Amy | 0.15 (0.015) | 0.15 (0.015) | 0.15 (0.015) | 0.15 (0.015) | 0.15 (0.015) | 0.15 (0.015) |
| Mann | 0 | 0.0 | 0.3 (0.03) | 0 | 0 | 0 |
| F* | 0.6 | 0.6 | 0.6 | 0.6 | 0.6 | 0.6 |
| C* | 0.0018 | 0.0018 | 0.0018 | 0.0018 | 0.0018 | 0.0018 |
| Ratio EA 7EO:EA 3EO | 2.9:1 | 2.9:1 | 2.9:1 | 2.9:1 | 2.9:1 | 2.9:1 |
| Properties | 210 cps | 210 cps | 210 cps | 210 cps | 210 cps | 210 cps |

*the same fragrance and color were used in all of these formulations

TABLE 15

| Raw Material | E79 | E80* | E81* | E84 | E85 | E86 |
|---|---|---|---|---|---|---|
| $H_2O$ | 70.2382 | 70.3828 | 70.3882 | 65.3882 | 65.3882 | 69.8882 |
| SLES | 1.0 (0.27) | 1.0 (0.27) | 1.0 (0.27) | 1.0 (0.27) | 1.0 (0.27) | 1.0 (0.27) |
| EA 7EO | 10.5 | 10.5 | 10.5 | 10.5 | 10.5 | 10.5 |
| EA 3EO | 3.6 | 3.6 | 3.6 | 3.6 | 3.6 | 3.6 |
| FAA | 0 | 0 | 0 | 0 | 5.0 (1.5) | 0 |
| TEA | 0.21 (0.21) | 0.21 (0.21) | 0.21 (0.21) | 0.21 (0.21) | 0.21 (0.21) | 0.21 (0.21) |
| Gly | 3.5 (3.5) | 3.5 (3.5) | 3.5 (3.5) | 3.5 (3.5) | 3.5 (3.5) | 3.5 (3.5) |
| Bet | 6.5 (2.3) | 6.5 (2.3) | 6.5 (2.3) | 6.5 (2.3) | 6.5 (2.3) | 6.5 (2.3) |
| B2080 | 2.2 (1.8) | 2.2 (1.8) | 2.2 (1.8) | 2.2 (1.8) | 2.2 (1.8) | 2.2 (1.8) |
| GL47 | 0 | 0 | 0 | 5.0 (2.4) | 0 | 0 |
| CBS | 0.5 (0.075) | 0.5 (0.075) | 0.5 (0.075) | 0.5 (0.075) | 0.5 (0.075) | 0.5 (0.075) |
| XG | 0.15 | 0 | 0 | 0 | 0 | 0 |
| F** | 0.6 | 0.6 | 0.6 | 0.6 | 0.6 | 0.6 |
| Mann | 0.0 | 0.0 | 0.0 | 0 | 0 | 0.5 (0.05) |
| MC | 1.0 (0.17) | 1.0 (0.17) | 1.0 (0.17) | 1.0 (0.17) | 1.0 (0.17) | 1.0 (0.17) |
| C*** | 0.0018 | 0.0072 | 0.0018 | 0.0018 | 0.0018 | 0.0018 |
| Ratio EA 7EO:EA 3EO | 2.9:1 | 2.9:1 | 2.9:1 | 2.9:1 | 2.9:1 | 2.9:1 |
| Properties | 1100 cps | 300 cps | 300 cps | 200 cps Decreased viscosity due to Dissolvine | 400 cps | 650 cps |

* preferred formulations
**the same fragrance was used in all of these formulations
***the same color was used in BS81 and BS84-86; unique colors were used in each of BS79 and BS80

TABLE 16

| Raw Material | E91 | E95 | E69 | E70 | E75 | E64 |
|---|---|---|---|---|---|---|
| $H_2O$ | 65.3882 | 65.5882 | 69.589 | 68.1382 | 67.5882 | 67.92 |
| SLES | 1.0 (0.27) | 1.0 (0.27) | 2.0 (0.54) | 2.0 (0.54) | 2.0 (0.54) | 1.2 (0.32) |
| ABS | 0 | 7.0 | 0 | 0 | 0 | 0 |
| EA 7EO | 10.5 | 10.5 | 11.0 | 12.3 | 12.3 | 12.6 |
| EA 3EO | 3.6 (6.72) | 3.6 | 3.79 | 4.2 | 4.2 | 4.84 |
| TEA | 0.21 (0.21) | 0.21 (0.21) | 0.21 (0.21) | 0.21 (0.21) | 0.21 (0.21) | 0.21 (0.21) |
| Gly | 3.5 (3.5) | 3.5 (3.5) | 3.5 (3.5) | 3.5 (3.5) | 3.5 (3.5) | 3.5 (3.5) |
| Bet | 6.5 (2.3) | 6.5 (2.3) | 6.5 (2.3) | 6.5 (2.3) | 6.5 (2.3) | 6.5 (2.3) |
| LO | 5.0 (1.5) | 0.0 | 0 | 0 | 0 | 0 |
| B2080 | 2.2 (1.8) | 0 | 2.56 (2.0) | 2.2 (1.8) | 2.2 (1.8) | 2.2 (1.8) |
| CBS | 0.5 (0.075) | 0.5 (0.075) | 0 | 0 | 0 | 0 |
| VB | 0 | 0 | 0 | 0.0 | 0.1 | 0.0 |
| F* | 0.6 | 0.6 | 0.5 | 0.6 | 0.6 | 0.6 |
| Pro-P | 0 | 0 | 0.2 (0.02) | 0.2 (0.02) | 0.35 (0.035) | 0.24 (0.024) |
| Amy | 0 | 0 | 0.15 (0.015) | 0.15 (0.015) | 0.15 (0.015) | 0.18 (0.018) |
| Mann | 0.0 | 0.0 | 0 | 0.0 | 0.3 (0.03) | 0.0 |
| MC | 1.0 (0.17) | 1.0 (0.17) | 0 | 0 | 0 | 0 |
| C | 0.0018 | 0.0018 | 0.001 | 0.0018 | 0.0018 | 0.01 |
| Ratio EA 7EO:EA 3EO | 2.9:1 | 2.9:1 | 2.9:1 | 2.9:1 | 2.9:1 | 2.6:1 |

*the same fragrance was used in all of these formulations
**E91 and E95 used the same color; E64, E69, E70, E75 used the same color, which differed from that of E91 and E95

Consumers prefer laundry detergents having a viscosity ranging from approximately 180 cps to approximately 750 cps, preferably from approximately 200 cps to approximately 500 cps, as measured by a Brookfield viscometer using spindle S31 at 20° C. and 20 rpm. Except for E79 and E86, the viscosities of these formulations are either close to or in the desired viscosity range.

Based on these results, Applicants believe that superior formulations may be obtained from:

a) a cationic biocide, a betaine, a nonionic surfactant, and an anionic surfactant, wherein the nonionic surfactant is the predominant surfactant;

b) a cationic biocide, a betaine, a nonionic surfactant, and an anionic surfactant, wherein the composition has a viscosity ranging from approximately 200 cps to approximately 500 cps as measured by a Brookfield viscometer using spindle S31 at 20° C. and 20 rpm;

c) a cationic biocide, a betaine, a nonionic surfactant, and an anionic surfactant, wherein the nonionic surfactant is a mixture of EA 7EO and EA 3EO having a ratio ranging from approximately 2.3 to approximately 2.9;

d) a cationic biocide, a betaine, a nonionic surfactant, and an anionic surfactant, wherein the nonionic surfactant is a mixture of EA 7EO and EA 3EO having a ratio of approximately 2.6;

e) a cationic biocide, a betaine, a nonionic surfactant, and an anionic surfactant, wherein the nonionic surfactant is a mixture of EA 7EO and EA 3EO having a ratio of approximately 2.9;

f) a cationic biocide, a betaine, a C10-C16 7 ethoxylated alcohol, a C10-16 3 ethoxylated alcohol, and the sodium salt of a C12-14 ethoxylated alkyl ether sulfate;

g) a cationic biocide, cocamidopropyl betaine, a C10-C16 7 ethoxylated alcohol, a C10-16 3 ethoxylated alcohol, and the sodium salt of a C12-14 ethoxylated alkyl ether sulfate;

h) 0.1-1 active % w/w, preferably 0.2-0.6 active % w/w anionic surfactant, preferably SLES; 10-20% w/w of a nonionic surfactant blend, preferably EA 7EO and EA 3EO; and 1-5% active w/w, preferably 1-3% active w/w of a cationic biocide that does not contain benzyl functional groups, such as B2080. The formulation may further comprise 2-3 active % w/w of an amphoteric surfactant, such as Bet;

i) 0.1-1 active % w/w, preferably 0.2-0.6 active % w/w anionic surfactant, preferably SLES; 10-20% w/w of a nonionic surfactant blend, preferably EA 7EO and EA 3EO; and 1-5% active w/w, preferably 1-3% active w/w of a cationic biocide that does not contain benzyl functional groups, such as B2080, wherein EA 7EO and EA 3EO have a ratio ranging from approximately 2.3 to approximately 2.9. The formulation may further comprise 2-3 active % w/w of an amphoteric surfactant, such as Bet;

j) 0.1-1 active % w/w, preferably 0.2-0.65 active % w/w anionic surfactant, preferably SLES; 10-20% w/w of a nonionic surfactant blend, preferably EA 7EO and EA 3EO; and 1-5% active w/w, preferably 1-3% active w/w of a cationic biocide that does not contain benzyl functional groups, such as B2080, wherein EA 7EO and EA 3EO have a ratio of approximately 2.6. The formulation may further comprise 2-3 active % w/w of an amphoteric surfactant, such as Bet; or k) 0.1-1 active % w/w, preferably 0.2-0.65 active % w/w anionic surfactant, preferably SLES; 10-20% w/w of a nonionic surfactant blend, preferably EA 7EO and EA 3EO; and 1-5% active w/w, preferably 1-3% active w/w of a cationic biocide that does not contain benzyl functional groups, such as B2080, wherein EA 7EO and EA 3EO have a ratio of approximately 2.9. The formulation may further comprise 2-3 active % w/w of an amphoteric surfactant, such as Bet.

Example 8

In Table 17, anionic surfactant was added to formulations containing either alkyl dimethyl benzyl ammonium chloride or a blend of bis(3-aminopropyl) dodecyl amine and alkyl dimethyl ammonium chloride cationic biocides and a blend of alcohol ethoxylate nonionic surfactants.

TABLE 17

| Raw Material | E35 | E47 | E53 | E63 | E66 | E67 | E68 |
|---|---|---|---|---|---|---|---|
| $H_2O$ | 73.771 | 78.2982 | 78.885 | 75.165 | 74.099 | 73.515 | 77.219 |
| SLES | 1.0 (0.27) | 2.2 (0.59) | 2.2 (0.59) | 2.0 (0.54) | 2.0 (0.54) | 2.0 (0.54) | 2.2 (0.59) |
| EA 7EO | 7.5 | 7.75 | 7.75 | 9.1 | 10.5 | 10.0 | 7.75 |
| EA 3EO | 2.88 | 3.0 | 3.0 | 3.5 | 3.6 | 3.4 | 3.0 |
| LB | 0.0 | 1.25 (1.13) | 1.25 (1.13) | 0.85 (0.77) | 0.85 (0.77) | 0.85 (0.77) | 1.25 (1.13) |
| MB80 | 2.5 (2) | 0 | 0 | 0 | 0 | 0 | 0 |
| B2080 | 0.0 | 1.25 (1) | 1.25 (1) | 1.5 (1.2) | 0 | 1.5 (1.2) | 0.0 |
| B2280 | 0 | 0 | 0 | 0 | 1.25 (1) | 0.0 | 1.25 (1) |
| Bet | 9.0 (3.2) | 3.5 (1.2) | 3.5 (1.2) | 4.0 (1.4) | 4.0 (1.4) | 4.0 (1.4) | 3.5 (1.2) |
| TEA | 0.278 (0.275) | 0 | 0 | 0 | 0 | 0 | 0 |
| Gly | 2.0 (1.98) | 1.0 (0.99) | 1.0 (0.99) | 2.0 (1.98) | 2.0 (1.98) | 3.0 (2.97) | 1.0 (0.99) |
| VB | 0 | 0 | 0.08 | 0 | 0 | 0 | 0.08 |
| D | 0 | 0 | 0 | 0 | 0 | 0 | 1.0 |
| F* | 0.6 | 0.6 | 0 | 0.6 | 0.6 | 0.6 | 0.6 |
| Pro-P | 0 | 0.2 (0.02) | 0 | 0.15 (0.015) | 0.15 (0.015) | 0 | 0.2 (0.02) |
| Amy | 0.47 (0.047) | 0.1 (0.01) | 0.1 (0.01) | 0.15 (0.015) | 0.1 (0.01) | 0.15 (0.015) | 0.1 (0.01) |
| CA | 0.0 | 0.85 (0.425) | 0.984 (0.492) | 0.984 (0.492) | 0.85 (0.425) | 0.984 (0.492) | 0.85 (0.425) |
| C** | 0.001 | 0.002 | 0.001 | 0.001 | 0.001 | 0.001 | 0.001 |
| Ratio EA 7EO:EA 3EO | 2.6:1 | 2.6: | 2.6:1 | 2.6:1 | 2.9:1 | 2.9:1 | 2.6:1 |
| Properties | pH 8.0 205 cps | 130 cps | pH 8.06 52 cps CP <- 4° C. ok after 1 week | 225 cps Ok after 1 week | 210 cps | 210 cps Ok after 1 week | 210 cps |

*3 different fragrances were used: E35 used a unique fragrance; E47 and E68 shared the same fragrance; E63, E66, and E67 shared the same fragrance

**the same color was used in all of these formulations

Consumers prefer laundry detergents having a viscosity ranging from approximately 180 cps to approximately 750 cps, preferably from approximately 200 cps to approximately 500 cps, as measured by a Brookfield viscometer using spindle S31 at 20° C. and 20 rpm. Except for E47 and E53, the viscosities of these formulations are either close to or in the desired viscosity range.

Based on these results, Applicants believe that superior formulations may be obtained from:

a) a cationic biocide, a betaine, a nonionic surfactant, and an anionic surfactant;

b) a cationic biocide, a betaine, a nonionic surfactant, and an anionic surfactant, wherein the nonionic surfactant is the predominant surfactant;

c) a cationic biocide, a betaine, a nonionic surfactant, and an anionic surfactant, wherein the composition has a viscosity ranging from approximately 200 cps to approximately 500 cps as measured by a Brookfield viscometer using spindle S31 at 20° C. and 20 rpm;

d) a cationic biocide, a betaine, a nonionic surfactant, and an anionic surfactant, wherein the nonionic surfactant is a mixture of EA 7EO and EA 3EO having a ratio ranging from approximately 2.3 to approximately 2.9;

e) a cationic biocide, a betaine, a nonionic surfactant, and an anionic surfactant, wherein the nonionic surfactant is a mixture of EA 7EO and EA 3EO having a ratio of approximately 2.6;

f) a cationic biocide, a betaine, a nonionic surfactant, and an anionic surfactant, wherein the nonionic surfactant is a mixture of EA 7EO and EA 3EO having a ratio of approximately 2.9;

g) a cationic biocide, a betaine, a C10-C16 7 ethoxylated alcohol, a C10-16 3 ethoxylated alcohol, and the sodium salt of a C12-14 ethoxylated alkyl ether sulfate;

h) a cationic biocide, cocamidopropyl betaine, a C10-C16 7 ethoxylated alcohol, a C10-16 3 ethoxylated alcohol, and the sodium salt of a C12-14 ethoxylated alkyl ether sulfate;

i) 0.1-1 active % w/w, preferably 0.2-0.6 active % w/w anionic surfactant, preferably SLES; 10-20% w/w of a nonionic surfactant blend, preferably EA 7EO and EA 3EO; and 0.5-5% active w/w, preferably 0.5-2.5% active w/w of a cationic biocide, such as LB, MB80, B2080, B2280, or mixtures thereof. The formulation may further comprise 1-4 active % w/w of an amphoteric surfactant, such as Bet;

j) 0.1-1 active % w/w, preferably 0.2-0.6 active % w/w anionic surfactant, preferably SLES; 10-20% w/w of a nonionic surfactant blend, preferably EA 7EO and EA 3EO; and 0.5-5% active w/w, preferably 0.5-2.5% active w/w of a cationic biocide, such as LB, MB80, B2080, B2280, or mixtures thereof; wherein EA 7EO and EA 3EO have a ratio ranging from approximately 2.3 to approximately 2.9. The 15 formulation may further comprise 1-4 active % w/w of an amphoteric surfactant, such as Bet;

k) 0.1-1 active % w/w, preferably 0.2-0.65 active % w/w anionic surfactant, preferably SLES; 10-20% w/w of a nonionic surfactant blend, preferably EA 7EO and EA 3EO; and 0.5-5% active w/w, preferably 0.5-2.5% active w/w of a cationic biocide, such as LB, MB80, B2080, B2280, or mixtures thereof; wherein EA 7EO and EA 3EO have a ratio of approximately 2.6. The formulation may further comprise 1-4 active % w/w of an amphoteric surfactant, such as Bet; or l) 0.1-1 active % w/w, preferably 0.2-0.65 active % w/w anionic surfactant, preferably SLES; 10-20% w/w of a nonionic surfactant blend, preferably EA 7EO and EA 3EO; and 0.5-5% active w/w, preferably 0.5-2.5% active w/w of a cationic biocide, such as LB, MB80, B2080, B2280, or mixtures thereof; wherein EA 7EO and EA 3EO have a ratio of approximately 2.9. The formulation may further comprise 1-4 active % w/w of an amphoteric surfactant, such as Bet.

Example 10

In Tables 18 and 19, anionic surfactant was added to formulations containing alkyl dimethyl ammonium chloride and a blend of three alcohol ethoxylate nonionic surfactants.

TABLE 18

| Raw Material | E90 | E92 | E93 | E94 |
|---|---|---|---|---|
| $H_2O$ | 63.4382 | 59.9882 | 58.4882 | 57.4882 |
| SLES | 1.0 (0.27) | 1.0 (0.27) | 1.0 (0.27) | 6.5 (1.8) |
| EA 7EO | 10.5 | 10.5 | 10.5 | 10.5 |
| EA 3EO | 3.6 | 3.6 | 3.6 | 3.6 |
| EA 8EO | 6.0 | 7.0 | 7.0 | 7.0 |
| TEA | 0.21 (0.21) | 0.21 (0.21) | 0.21 (0.21) | 0.21 (0.21) |
| GL45 | 0.0 | 3.0 (1.4) | 0.0 | 0.0 |
| GL47 | 1.5 (0.71) | 0.0 | 0.0 | 0.0 |
| Gly | 3.5 (3.5) | 3.5 (3.5) | 3.5 (3.5) | 3.5 (3.5) |
| Bet | 6.5 (2.3) | 6.5 (2.3) | 6.5 (2.3) | 6.5 (2.3) |
| B2080 | 2.2 (1.8) | 2.2 (1.8) | 2.2 (1.8) | 2.2 (1.8) |
| CBS | 0.25 (0.0375) | 0.5 (0.075) | 0.5 (0.075) | 0.5 (0.075) |
| F* | 0.6 | 0.6 | 0.6 | 0.6 |
| Mann | 0.2 (0.02) | 0.4 (0.04) | 0.4 (0.04) | 0.4 (0.04) |
| MC | 0.5 (0.085) | 1.0 (0.17) | 1.0 (0.17) | 1.0 (0.17) |
| C* | 0.0018 | 0.0018 | 0.0018 | 0.0018 |
| Ratio EA 7EO:EA 3EO | 2.9:1 | 2.9:1 | 2.9:1 | 2.9:1 |
| Properties | 400 cps | 205 cps | 690 cps | 705cps |

*the same color and fragrance were used in all of these formulations

TABLE 19

| Raw Material | E98 | E146 | E147 |
|---|---|---|---|
| $H_2O$ | 58.3682 | 62.3062 | 64.9862 |
| SLES | 3.0 (0.81) | 4.6 (1.242) | 5 (1.35) |
| EA 7EO | 10.5 | 8.8 | 7.7 |
| EA 3EO | 3.6 | 1.2 | 2.3 |
| EA 8EO | 7.0 | 9.1 | 10.0 |
| TEA | 0.21 (0.21) | 0 | 0 |
| GL47 | 2.5 (1.2) | 3.0 (1.41) | 1.0 (0.47) |
| Gly | 3.5 (3.5) | 4.1 | 0 |
| Bet | 6.5 (2.3) | 3.1 (1.147) | 5.4 (1.998) |
| B2080 | 2.2 (1.8) | 2.2 (1.8) | 2.2 (1.8) |
| CBS | 0.5 (0.075) | 0.1 | 0.1 |
| F | 0.6 | 0.6 | 0.6 |
| Mann | 0.4 (0.04) | 0.2 | 0.2 |
| MC | 1.0 (0.17) | 0.5 | 0.5 |
| CC | 0 | 0.4 (0.02) | 0.4 (0.02) |
| CA | 0.33 (0.165) | 0.192 (0.096) | 0.012 (0.006) |
| C | 0.0018 | 0.18 | 0.18 |
| Properties | 290 cps | 480 cps | 480 cps |

*Samples of E98 underwent 12 week stability testing at 5° C., 25° C., 30° C. with 60% relative humidity, 40° C. with 75% relative humidity, and 50° C. The 50° C. samples exhibited phase separation, but no colour or cloudiness changes. Even after 12 weeks at 50° C., the phases reintegrated when the sample cooled to room temperature. None of the other samples exhibited any change in colour, cloudiness or phase separation. The viscosity remained within 10% of the initial viscosity for all of the samples. The pH of the samples stored at 5° C., 25° C., and 30° C./65% RH remained within 10% of the initial pH (measured on a 5% w/w solution). A larger pH decrease occurred for the higher temperature samples.

Consumers prefer laundry detergents having a viscosity ranging from approximately 180 cps to approximately 750 cps, preferably from approximately 200 cps to approximately 500 cps, as measured by a Brookfield viscometer using spindle S31 at 20° C. and 20 rpm. Except for E93 and E94, the viscosities of these formulations are either close to or in the desired viscosity range.

Based on these results, Applicants believe that superior formulations may be obtained from:

a) a cationic biocide, a nonionic surfactant, an anionic surfactant, and an amphoteric surfactant;

b) a cationic biocide, an amphoteric surfactant, a nonionic surfactant, and an anionic surfactant, wherein the nonionic surfactant is the predominant surfactant;

c) a cationic biocide, an amphoteric surfactant, a nonionic surfactant, and an anionic surfactant, wherein the composition has a viscosity ranging from approximately 200 cps to approximately 500 cps as measured by a Brookfield viscometer using spindle S31 at 20° C. and 20 rpm;

d) a cationic biocide, a betaine, a C10-C16 EO7 alcohol ethoxylate, a C10-16 3EO alcohol ethoxylate, a C13-15 EO8 alcohol ethoxylate, and the sodium salt of a C12-14 ethoxylated alkyl ether sulfate;

g) a cationic biocide, cocamidopropyl betaine, a C10-C16 EO7 alcohol ethoxylate, a C10-16 EO3 alcohol ethoxylate, a C13-15 EO8 alcohol ethoxylate, and the sodium salt of a C12-14 ethoxylated alkyl ether sulfate;

h) 0.1-2.5 active % w/w, preferably 0.15-1.6 active % w/w anionic surfactant, preferably SLES; 15-25% w/w of a nonionic surfactant blend, preferably EA 7EO, EA 3EO, and EA 8EO; and 0.5-2.5% active w/w of a cationic biocide, such as LB, MB80, B2080, B2280, or mixtures thereof. The formulation may further comprise 1-4 active % w/w of an amphoteric surfactant, such as Bet;

i) 0.1-2.5 active % w/w, preferably 0.16-1.6 active % w/w anionic surfactant, preferably SLES; 15-25% w/w of a nonionic surfactant blend, preferably EA 7EO, EA 3EO, and EA 8EO; and 0.5-2.5% active w/w of a cationic biocide, such as LB, MB80, B2080, B2280, or mixtures thereof; wherein EA 7EO and EA 3EO have a ratio ranging from approximately 2.3 to approximately 2.9. The formulation may further comprise 1-4 active % w/w of an amphoteric surfactant, such as Bet; or j) 0.1-2.5 active % w/w, preferably 0.15-0.1.5 active % w/w anionic surfactant, preferably SLES; 15-25% w/w of a nonionic surfactant blend, preferably EA 7EO, EA 3EO, and EA 8EO; and 0.5-2.5% active w/w of a cationic biocide, such as LB, MB80, B2080, B2280, or mixtures thereof; wherein EA 7EO and EA 3EO have a ratio of approximately 2.9. The formulation may further comprise 1-4 active % w/w of an amphoteric surfactant, such as Bet.

Example 11: Stain Removal-Spectrophotometry

Stain removal may be evaluated using reflectance according to International Electrotechnical Commission (IEC) method 60456, entitled Clothes Washing Machines for Household Use—Methods for Measuring Performance. A spectrophotometer measures reflectance using the Y-value of the Y, x, y color coordinate measurements. The Y value provides the intensity of the stain in terms of darker/lighter. Higher Y values mean a lighter stain and therefore more clean than lower Y values/darker stains. The present reflectance was measured using a D65 light source with a UV cut-off filter at 420 nm. The stains were measured unfolded, with 2 measurements per stain (in the center of the circular area, or closest homogenous area). FIG. 2 is a graph showing the average Y value of formulations E1-E8, E9-E29, E30-E81, and E82-E98.

Example 12: Foam Generation

Figure 3:
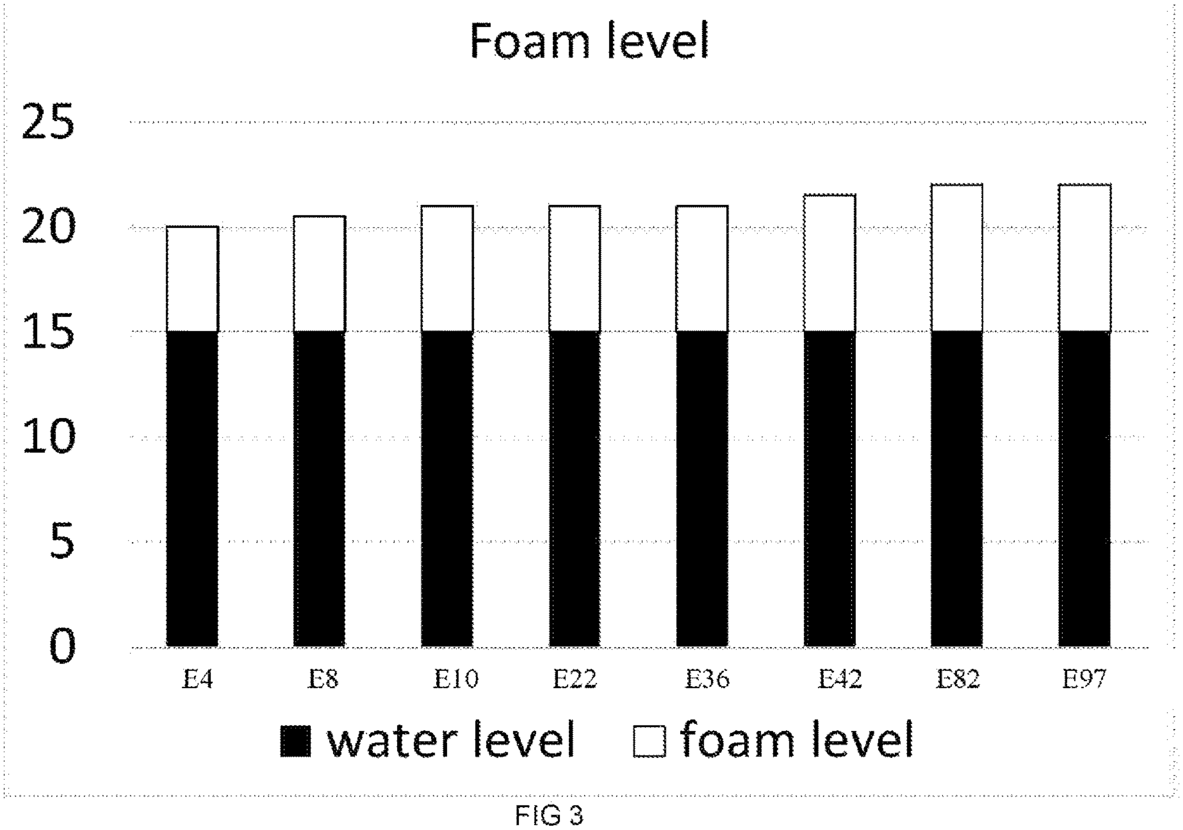
FIG. 3 is a graph showing the water and foam levels in cm for formulations E4, E8, E10, E22, E36, E42, E82, E98, and E145.
Figure 4:
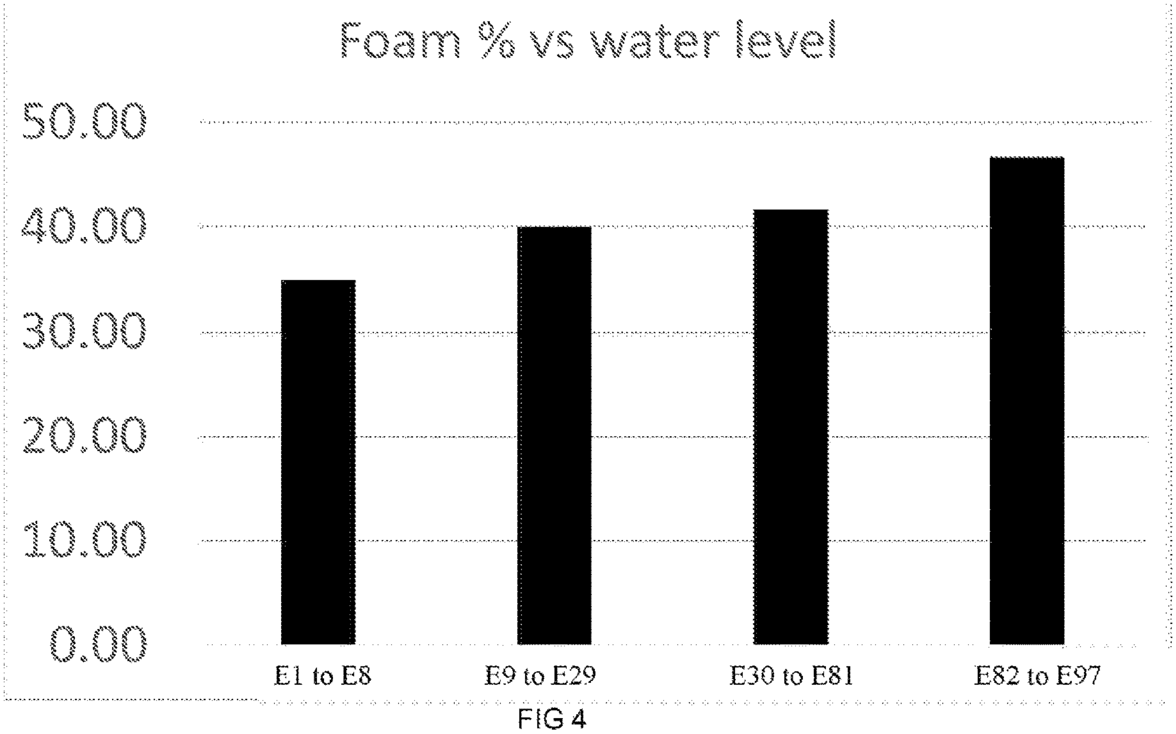
FIG. 4 is a graph showing the percent foam versus water level of formulations E1-E8, E9-E29, E30-E81, and E82-E98.

Foam measurements were also calculated on formulations E1-E98 and E145. 0.4 g of the formulation was added to 500 ml of water and agitated for 3 minutes in a Gerhardt machine at level 6 speed. Agitation was stopped and the sample remained at rest for 2 minutes. The level of water and foam generated on top of the water were measured. FIG. 3 is a graph showing the water and foam levels in cm for formulations E4, E8, E10, E22, E36, E42, E82, E98, and E145. As can be seen, all 8 test formulations had approximately 15 cm of water. The height of the foam increased as the sample numbers increased. Sample E4 generated approximately 5 cm foam. Sample E8 generated approximately 5.5 cm foam. Samples E10, E22, and E36 generated approximately 6 cm foam. Sample E42 generated approximately 6.5 cm of foam. Samples E82, E98, and E145 generated approximately 7 cm foam. FIG. 4 is a graph showing the percent foam versus water level of formulations E1-E8, E9-E29, E30-E81, and E82-E98. Samples E1 to E8 generated approximately 35% foam versus water. Samples E9 to E29 generated approximately 40% foam to water. Samples 30 to E81 generated approximately 42% foam to water. Samples E82 to E97 and E145 generated approximately 47% foam to water. Increased amounts of foam are desired because the foam creates a cushion inside the fiber of the clothes to help limit friction and mechanical stress.

Example 13: Bacteria Removal

Table 20 provides a publicly available listing of ingredients of several commercially-available laundry detergents. These detergents were used for comparison in some of the examples that follow. As can be seen, none of these formulations include a combination of anionic and cationic surfactants.

TABLE 20

| Raw Material | C1* | C2* | C3* | C4* | C5* | C6* |
|---|---|---|---|---|---|---|
| Alcohol Ethoxy Sulfate | | | X | | | X |
| Sodium Laureth Sulfate | X | X | | X | | |
| Sodium Lauryl Sulfate | X | X | | X | | |
| Alkylbenzene Sulfonate | | | X | | | X |
| Disodium Distyryl Biphenyl Disulfonate | | | X | | | |
| MEA*-Dodecylbenzene Sulfonate | X | | | X | | |
| Sodium Cumene Sulfonate | X | | | | | |
| Sodium C10-16 Alkylbenzene Sulfonate | K | X | | X | | |
| Sodium Dodecylbenzene Sulfonate | | | | | X | |
| Sodium Xylenesulfonate | | | | | X | |

TABLE 20-continued

| Raw Material | C1* | C2* | C3* | C4* | C5* | C6* |
|---|---|---|---|---|---|---|
| Disodium Diaminostilbene Disulfonic Acid | | | | | | X |
| Alcohol Ethoxylate | | | X | | | X |
| C12-16 Pareth | X | | | | | |
| Ethoxylated Lauryl Alcohol | | | | | X | |
| Fatty Acids | | | | | | X |
| Hydrogenated Caster Oil | | | | X | | |
| MEA Salts of C12-C18 Fatty Acids | X | | | | | |
| Polyethylene Imine Ethoxylate | X | | X | | | |
| Polyethyleneimine, Alkoxylated | X | | | | | |
| Sodium Soap | | | X | | | |
| C10-16 Alkyldimethylamine Oxide | X | | | | | |
| Methoxypolyoxymethylene Melamine | | | | X | | |
| Methylisothiazolinone | | | | | | X |
| Stilbene Disulfonic Acid Triazine Derivative | | | | | X | |
| Amylase Enzyme | X | | | X | | |
| Cellulase | | | | | | |
| Mannanase | X | | | | | |
| Protease | | | X | | | |
| Subtilisin | X | | | X | | |
| 3-methyl-4-(2,6,6-trimethyl-2-cyclohexene-1-yl)-3-butene-2-one | | | X | | | |
| Amyl Cinnamal | | | | | | |
| Benzyl Salicylate | | | | | | |
| D-limonene | | | | | | |
| Eugenol | | | | | | |
| Geraniol | | | | | | |
| Hexylcinnamaldehyde | | | X | | | |
| Lilial | | | X | | | |
| Linalool | | | X | X | X | X |
| Alcohol | X | X | | X | | |
| Ethanol | | | X | | | |
| Diethylene Glycol | | | | | | |
| Ethanolamine | X | | | | | |
| Propylene Glycol | X | | X | | | |
| Calcium Formate | X | X | | | | |
| Ethanolamine Citrate | | X | | | | |
| MEA-Citrate | X | | | | | |
| Sodium Borate | X | | X | X | | |
| Sodium Carbonate | | | | | | X |
| Sodium Citrate | X | X | X | X | | |
| Sodium Chloride | | | | | | X |
| Sodium Cocoate | | | | | X | |
| Sodium Formate | | X | X | X | | |
| Sodium Silicate | | | | | X | |
| Phenylpropyl Ethyl Methicone | | | | | | |
| Polydimethylsiloxane | | | X | | | |
| Simethicone | | | | X | | |
| Trimethylsiloxysilicate | | | | X | | |
| Sodium Polyacrylate | | | | | | X |
| Pentasodium Pentetate | X | X | | X | | |
| Tetrasodium EDTA | | | X | | | X |
| Fragrance | X | X | X | X | | X |
| Long Lasting Fragrance | | | | X | | |
| Fluorescent Brightener | X | X | | X | | |
| Liquitint Blue AH | X | | | | | X |
| Liquitint ® Dye | | X | | X | | |
| Blue Dye | | | X | | | |

*Formulations based on publicly available information from websites
**MEA = monoethanolamine Removes Bacteria from Fabric—Test Method Development Test Materials (Media, Reagents, Equipment, Supplies)

1. 1×1 inch cotton fabric test swatches (Fabric specifications are from ASTM E2274) (ASTM was formerly known as the American Society for Testing and Materials). Swatches are sterilized by autoclaving in glass petri dishes.
2. Positive displacement micropipette capable of delivering 100 μL
3. Sterile disposable petri dishes (20×150 mm)
4. Sterile glass petri dishes
5. Test Cultures: 48±4 hour test culture of *Staphylococcus aureus* ATCC 6538. 48±4 hour culture of *Klebsiella pneumoniae* ATCC 4352. These are the representative gram (+) and gram (−) organisms found in ASTM 2274 Laundry Sanitization and Disinfection method. Additional organisms can be used in testing if desired. (ATCC is the American Type Culture Collection)
6. Horse Serum (organic soil)
7. Tryptic Soy Broth
8. Tryptic Soy Agar
9. Tryptone Sodium Chloride (TSC), Phosphate Buffer Working Solution (PBS) or other appropriate diluent used for serial diluting microbiological samples.
10. Letheen Broth, Universal Neutralizer or any other appropriate neutralizing media.
11. Sterile specimen cups
12. Volumetric flasks 13. Balance
14.2.2 mL sterile disposable pipettes
15.5 mL sterile disposable pipettes
16. 10 mL sterile disposable pipettes
17.25 mL sterile disposable pipettes
18. Forceps
19.70 to 99% Ethanol
20. Bunsen Burner
21. Vortex
22. Sterile 20×100 mm test tubes
23. Sterile 25×100 mm test tubes containing 5 grams of 4 mm sterile glass beads
24. Autoclave
25. Water batch for molten agar (45 to 48° C.)
26. Incubators (35 to 37° C.) (for drying inoculated test swatches and for incubating test agar plates).
27. 400 ppm AOAC Hard Water (tested as a control and used to make test substance dilutions) (AOAC used to be the Association of Official Agricultural Chemists, which changed to the Association of Official Analytical Chemists, and now is simply AOAC—allegedly no longer an acronym).

Organism Preparation/Test Swatch Inoculation and Drying

1. Each 48±4 hour test culture is vortexed for 10 to 15 seconds, and allowed to sit on the bench top for at least 10 minutes. At that time, the top ⅔rds of the test culture is pipetted off. The top portion of different test culture tubes of the same organism can be pooled.
2. A 1:10 dilution of the pooled culture is prepared using Tryptic Soy Broth as the diluent.
3. Horse serum is added to the 1:10 culture dilution to yield a final concentration of 5% organic soil (e.g. 1 mL of Horse Serum+19.0 mL of Test Culture dilution).
4. Test swatches are contained in sterile glass petri dishes (3 per dish).
5. Each test swatch is inoculated with 100 μL (0.1 mL) of the test culture containing organic soil.
6. (5) inoculated swatches will be evaluated for each test substance dilution, plus a hard water control. Additionally, (3) inoculated swatches will be dried but not treated. These will serve as Dried Recovery controls and will be assayed to determine the average number of organisms on a swatch after drying. The number of test replicates is taken from an established test method: ASTM E1153 Non Food Contact Sanitization.
7. Inoculated swatches are dried at 36.0±1.0 C for 20 to 30 minutes. "Cracking" open the lid of the petri dish will assist in drying the inoculated swatches in this time period.
8. Inoculated swatches must be completely dried before testing. A visual assessment of each swatch can determine if the swatch is dry (no wetness observed). If a swatch is picked up with sterile forceps, it should not "stick" to the petri dish. This is a sign that a swatch is not entirely dry.
9. After drying, each inoculated and dried test swatch is aseptically placed into a sterile specimen cup. This is where the treatment/exposure/agitation will occur.

Test Substance Dilution Preparation

1. Each test substance dilution is prepared using 400 ppm AOAC Hard Water as the diluent. This is a choice of the hard water in the recent 810 guidelines that must be used when diluting test substances for efficacy testing.
2. Dilutions are prepared as "part to total parts". A 1:100 dilution is defined as 1 part of test substance+99 parts of diluent.
3. In cases where a test substance would be used in conjunction with a laundry detergent, both doses are considered and added to an appropriate volume of 400 ppm Hard Water diluent.
4. 400 ppm AOAC Hard Water will used as the Non-Active control in this testing and will be used to evaluate the removal of bacteria from fabric by water alone. Recovery from each test substance will be compared to the recovery from water alone. A difference of ≥1 $Log_{10}$ will satisfy the acceptance criteria for a claim of "Removes Bacteria". An example of how this is determined is discussed in more detail in the Calculation Section below.

Treatment of Inoculated Swatches with Test Substance

1. As described previously, each specimen cup will contain an inoculated and dried test swatch.
2. Fifty (50) mL of a test substance dilution is added to each of 5 specimen cups (5 replicates per test substance). The lid of the specimen cup is tightly secured. The specimen cups are each placed into a holder of the orbital shaker.
3. The shaker is set to approximately 200 rotations per minute. The specimen cups are allowed to shake/agitate for 20 minutes. A 20-minute exposure time was chosen as it reflects an average washing machine wash cycle.

Subculture and Plating

1. After the 20-minute exposure time, the specimen cups are removed from the orbital shaker.
2. Using alcohol flamed and cooled forceps, each swatch is removed from 50 mLs of test substance dilution and added to a sterile test tube containing 20 mLs of sterile 400 AOAC Hard Water. The tube is vortexed for 10 to 15 seconds. This step simulates the rinse cycle after clothes are washed in a washing machine.
3. After vortexing, the swatch is removed and subcultured into a 25×100 mm test tube containing 5 grams of glass beads, and 10 mLs of neutralizing media.
4. The 20 mLs of sterile 400 ppm hard water used to rinse the fabric test swatch is added to the specimen cup containing the 50 mLs of test substance dilution.
5. The test tube containing the swatch is vortexed for 10 to 15 seconds, and 1:10 serial dilutions are performed using Tryptone Sodium Chloride diluent. One (1) mL of the 10°, 10-1, 10-2 and 10-3 dilutions are plated in duplicate using Tryptic Soy Agar.
6. The specimen cup containing the 70 mLs (50 mL of test substance dilution and 20 mL of 400 ppm AOAC Hard Water rinse water) is swirled to mix, and one (1) mL is subcultured into 9 mL of neutralizing media. Serial dilutions are performed using TSC diluent. One (1) mL of the 10-1, 10-2, 10-3 and 10-4 dilutions are plated in duplicate using Tryptic Soy Agar.
7. Dried Recovery control replicates (3) are not treated and are each subcultured into 10 mL of neutralizing media/5 grams glass beads after drying. Each tube is vortexed for 10 to 15 seconds. Serial dilutions are performed using an appropriate diluent. One (1) mL of the 10-2, 10-2 and 10-4 dilutions are plated in duplicate using Tryptic Soy Agar.

Incubation/Plate Counting

All test plates are incubated at 36±1.0° C. for 48+/−2 hours. A longer incubation period is acceptable as long as it is evident that the plates are still countable, and the agar media has not dried up/become dehydrated.

Each plate is counted. Plates with >300 colonies are deemed as TNTC (Too Numerous to Count). All plates with counts between 0 and 300 will be used in calculations.

Calculations/Determination of the $Log_{10}$ Reductions of Organisms on Fabric Test Carriers The instructions for determining the recovery of organism on each fabric test carrier is being taken from the latest revision of the AOAC Use Dilution Test Method for *Staphylococcus aureus*. This method, 955.15, was revised by the AOAC in January 2013. This calculation uses plate counts from 0 to 300 and takes into consideration the dilutions from which the recovery/counts were obtained and the volume of subculture.

TABLE 21

Recovery for Test Substance A vs. *Staphylococcus aureus*

| Replicate | Dilution | Count Per Plate | Average Count Per Plate |
|---|---|---|---|
| 1 | $10^0$ | TNTC, TNTC | n/a |
| | $10^{-1}$ * | 195, 209 | 202 |
| | $10^{-2}$ * | 20, 22 | 21 |
| | $10^{-3}$ * | 1, 2 | 2 |
| 2 | $10^0$ | TNTC, TNTC | n/a |
| | $10^{-1}$ * | 243, 251 | 247 |
| | $10^{-2}$ * | 30, 34 | 32 |
| | $10^{-3}$ * | 3, 4 | 4 |
| 3 | $10^0$ | TNTC, TNTC | n/a |
| | $10^{-1}$ * | 260, 250 | 255 |
| | $10^{-2}$ * | 25, 27 | 26 |
| | $10^{-3}$ * | 4, 2 | 3 |

Key:
An * indicates the counts used in calculations.
Counts of 0 to 300 are considered valid counts.
TNTC = Too Numerous To Count
n/a-Average count for this dilution will not be used in calculations.

Calculation Example (Continued)

Replicate 1

$$\text{Average } CFU/\text{mL} = \frac{202+21+2}{(10^{-1}+10^{-2}+10^{-3})} = 2.03\times10^3$$

$$\text{Average } CFU/\text{carrier} = 2.03\times10^3(\times10 \text{ mLs}) = 2.03\times10^4$$

$$\text{Log}_{10} \text{ of } 2.03\times10^4 = 4.31$$

Replicate 2

$$\text{Average } CFU/\text{mL} = \frac{247+32+4}{(10^{-1}+10^{-2}+10^{-3})} = 2.55\times10^3$$

$$\text{Average } CFU/\text{carrier} = 2.55\times10^3(\times10 \text{ mLs}) = 2.55\times10^4$$

$$\text{Log}_{10} \text{ of } 2.55\times10^4 = 4.41$$

Replicate 3

$$\text{Average } CFU/\text{mL} = \frac{255+26+3}{(10^{-1}+10^{-2}+10^{-3})} = 2.56\times10^3$$

$$\text{Average } CFU/\text{carrier} = 2.56\times10^3(\times10 \text{ mLs}) = 2.56\times10^4$$

$$\text{Log}_{10} \text{ of } 2.56\times10^4 = 4.41$$

$$M = \text{Mean Log}_{10} \text{ Density of the 3 carriers} = \frac{4.31+4.41+4.41}{3} = 4.38$$

For this example, if the Mean $Log_{10}$ Density of the Water Control for *Staphylococcus aureus* was 6.65, then the $Log_{10}$ Reduction for Test Substance A against *Staphylococcus aureus* would be:

6.65–4.38=2.27 $Log_{10}$ Reduction or Removal

Acceptance Criteria

This would meet the acceptance criteria of ≥1.0 $Log_{10}$ reduction of organism as compared to the water control. This reduction demonstrates that the product removes bacteria.

Determining the Number of Organisms Surviving in the Test or Substance Dilution Water (Test and Control)

1. The number of CFU per mL is calculated as described above using all values between 0 and 300.
2. To calculate the number of organisms in the total volume (50 mL test substance dilution+20 mL rinse water), multiply the CFU per mL by 70.
3. For example, if there are $4.2\times10^2$ organisms per mL, as determined by plating, then the total amount of organism in the 70 mLs is $(4.2\times10^2\times70)$ or $2.94\times10^4$
4. Knowing the number of organisms on the test swatch, and in the corresponding test substance dilution is useful for evaluating whether the test substance is actually killing the test organism. If the test substance does not kill the test organism, the amount of organism on the swatch and the amount of organism in the corresponding wash water should correlate approximately to the amount inoculated onto the test swatch, as determined by the Dried Recovery Control count.

Results:

TABLE 22

| Average Recovery on Water Control Swatch | Product Tested | Average Recovery on Swatch | $Log_{10}$ Reduction *Staphylococcus aureus* ATCC6538 (Control-Test) |
|---|---|---|---|
| 6.12 | C1 | 5.27 | 0.85 |
| | C7* | 5.81 | 0.31 |
| | C8* | 3.72 | 2.40 |
| | Double dose of C7* | 5.20 | 0.92 |

*the formulations for C7 and C8 are not publicly available

TABLE 23

| Average Recovery on Dried Recovery Control * | Product Tested | Average Recovery on Swatch | $Log_{10}$ Reduction *Staphylococcus aureus* ATCC6538 (Control-Test) |
|---|---|---|---|
| 6.45 | 400 ppm AOAC Hard Water (CONTROL) | 6.07 | Not Applicable |
| | E49 | 4.40 | 1.67 |
| | E50 | 4.92 | 1.15 |
| | E52 | 3.79 | 2.28 |
| | E53 | 2.70 | 3.37 |

TABLE 24

| Average Recovery on Dried Recovery Control * | Product Tested | Average Recovery on Swatch | Log10 Reduction (Control-Test) *Klebsiella pneumoniae* ATCC 4352 |
|---|---|---|---|
| 6.10 | 400 ppm AOAC Hard Water (CONTROL) | 5.83 | Not Applicable |
| | C2 | 2.82 | 3.01 |
| | E52 | 1.0 | 4.83 |
| | E53 | 1.0 | 4.83 |

TABLE 25

| E98 bacteria removal results for *Staphylococcus aureus* ATCC6538: | |
|---|---|
| Test date | Result Log10 Reduction |
| AUG. 8, 2019 | 1.30 |
| AUG. 14, 2019 | 2.30 |
| JAN. 30, 2020 | 1.64 |
| (Batched at 80% active) | |

Lower numbers in the Average Recovery on Swatch column and higher numbers in the $Log_{10}$ Reduction column indicate that more bacteria have been removed. As can be seen, the present formulations produce larger bacterial reduction than any commercially available formulation.

Example 14: Stain Removal—ASTM D4265-14

Figure 5:
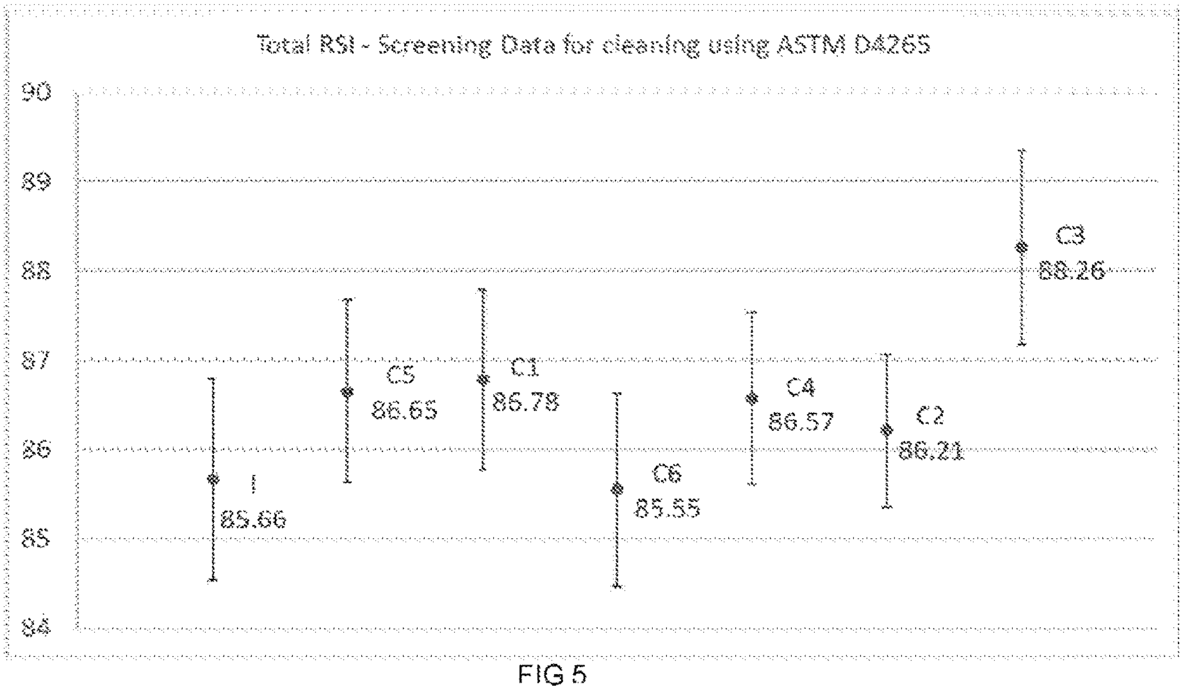
FIG. 5 is a graph showing the total Residual Stain Index as determined by ASTM D4265-14 one embodiment of the disclosed formulation (I=E42) when compared to commercially available competitive products.

The ASTM D4265-14 method for evaluating stain removal was used for a range of 22 stains. Exemplary stains include but are not limited to Oxidative/Bleachable, Particulate, Greasy, and Enzymatic. Bleachable stains include but are not limited to coffee, wine, tea, grape juice, blueberry juice, ink, ketchup, spaghetti sauce, mustard, beet juice, and soy sauce. Particulate stains include but are not limited to sebum, clay, and liquid makeup. Greasy stains include but are not limited to beef gravy, hamburger, grease, dirty motor oil, bacon grease, vegetable oil, French fry grease, and butter. Enzymatic stains include but are not limited to chocolate sauce, ASTM grass, and blood. As shown in FIG. 5, the proposed formulation delivers similar stain removal as compared to the current lead US laundry competitors. C1-C6 are defined above and I=E42. None of the competitors have bactericidal actives, which limits the surfactant composition suitable for cleaning. In other words, the addition of the cationic biocide to the present formulation limits the availability to include anionic surfactants, which are better at removing stains. Nonetheless, the present formulation still exhibits suitable stain removal and, as shown above, better bacterial removal. Formulations having a residual stain index ranging between approximately 84 to approximately 90 are suitable for commercial use.

Based on the stain performance method outlined in ASTM D4265-14, results should not be compared across studies due to variation in the test input parameters as conditions cannot be controlled to a level to allow relevant conclusions to be drawn between tests. All data shown in examples for stain performance correspond to single studies with multiple sample legs.

Example 15: Consumer Results (Home Use Study)

N samples of E98 and C1 were supplied to consumers in October 2019 for use at home. After using the products, consumer indicated whether they agreed with the following statement on a scale of 1-5, with 5 being Strongly Agree. The results are provided in Table 26.

TABLE 26

| | Statement: | E98 (N = 165) | C1 (N = 252) |
|---|---|---|---|
| Disinfection Efficacy | Is effective at killing germs | 4.6* | 4.4 |
| Cleaning Efficacy | Cleans effectively | 4.7 | 4.8 |

*Statistically superior at 90% confidence interval.

As can be seen, consumers found E98 to be more effective at killing germs than C1 and on par with C1 for cleaning efficacy.

It will be understood that various modifications may be made to the embodiments disclosed herein. Therefore, the above description should not be construed as limiting, but merely as exemplifications of embodiments. Those skilled in art will envision other modifications within the scope and spirit of the claims appended hereto.

We claim:

1. A composition comprising:

approximately 55% w/w to approximately 75% w/w water;

approximately 0.15% active w/w to approximately 1.5% active w/w sodium lauryl ether sulfate;

approximately 14% w/w to approximately 22% w/w C10-16 alcohol alkoxylate nonionic surfactant;

approximately 1.5% active w/w to approximately 3% active w/w cocoamidopropyl betaine;

approximately 1.5% active w/w to approximately 2.5% active w/w alkyl dimethyl ammonium chloride; and protease enzymes, wherein the nonionic surfactant comprises a mixture of C12-16 7 EO alcohol ethoxylate nonionic surfactant and C10-16 3 EO alcohol ethoxylate nonionic surfactant which are present in the composition in a respective weight ratio ranging from approximately 2.3:1 to approximately 2.9:1.

2. The composition of claim 1, wherein the composition has a viscosity ranging from approximately 200 cps to approximately 500 cps as measured by a Brookfield viscometer using spindle S31 at 20° C. and 20 rpm.

3. The composition of claim 1, wherein the alkyl dimethyl ammonium chloride does not contain benzyl functional groups.

4. The composition of claim 1, wherein the nonionic surfactant further comprises $C_{13-15}$ 8 EO alcohol ethoxylate.

5. The composition of claim 4, wherein the C13-15 8 EO alcohol ethoxylate nonionic surfactant is present in an amount of up to approximately 11% w/w.

6. The composition of claim 1, further comprising a mixture of the protease and an amylase.

7. The composition of claim 1, further comprising a mixture of the protease, an amylase, and a mannanase.

8. The composition of claim 1, further comprising a pH adjuster.

9. The composition of claim 1, the compositing having a pH ranging from approximately 8.0 to approximately 8.5 at room temperature.

10. A method of cleaning and sanitizing fabric, the method comprising adding between approximately 35 mL and approximately 90 mL of the composition according to claim 1 to a soap dispenser or tub of a washing machine on any washing cycle based on usage instructions.

11. The method of claim 10, wherein the method provides a greater than approximately 2.5 $log_{10}$ reduction in *Staphylococcus aureus* ATCC 6538 per ASTM 2274.

12. The method of claim 10, wherein the method provides between approximately a 1 $log_{10}$ and approximately a 5 $log_{10}$ reduction against poliovirus type 1 (Sabin).

13. The method of claim 10, wherein the method provides between approximately 85 and approximately 89 residual stain index based on ASTM D4265-14.

14. A method of making the composition according to claim 1, the method comprising:

mixing for about 15 minutes approximately 1.5% active w/w to approximately 3% active w/w cocoamidopropyl betaine and water to provide a pre-mix;

if necessary, adjusting the pH of the pre-mix to a range of approximately 8 to approximately 8.4 using a pH adjuster to form a pH-adjusted solution;

adding approximately 1.5% active w/w to approximately 2.5% active w/w alkyl dimethyl ammonium chloride to the pre-mix or pH-adjusted solution to produce a cationic solution;

adding approximately 0.15% active w/w to approximately 1.5% active w/w sodium lauryl ether sulfate to the cationic solution to produce an anionic-cationic solution;

adding approximately 14% w/w to approximately 22% w/w $C_{10-16}$ alcohol ethoxylate nonionic surfactant to the anionic-cationic solution to produce a surfactant solution and stirring the surfactant solution for approximately 5 to approximately 20 minutes; and adding protease enzymes to the surfactant solution to produce the composition, wherein the nonionic surfactant comprises a mixture of $C_{12-16}$ 7 EO alcohol ethoxylate nonionic surfactant and $C_{10-16}$ 3 EO alcohol ethoxylate nonionic surfactant which are present in the composition in a respective weight ratio ranging from approximately 2.3:1 to approximately 2.9:1.

15. The method of claim 14, wherein the composition has a viscosity ranging from approximately 200 cps to approximately 500 cps as measured by a Brookfield viscometer using spindle S31 at 20° C. and 20 rpm.

16. The method of claim 14, further comprising adding approximately 0.25% active w/w to approximately 1.5% active w/w tetrasodium salt of L-glutamic acid N,N'-diacetic acid to the premix.

17. The method of claim 14, further comprising adding approximately 2% w/w to approximately 4% w/w glycerin to the surfactant solution to produce a glycerin surfactant solution prior to addition of the protease enzyme.

* * * * *